US012699005B2

(12) United States Patent
Kulkarni et al.

(10) Patent No.: US 12,699,005 B2
(45) Date of Patent: Aug. 4, 2026

(54) METHOD OF CALIBRATING A SPECTRAL SENSING DEVICE

(71) Applicant: TRINAMIX GMBH, Ludwigshafen am Rhein (DE)

(72) Inventors: Sourabh Kulkarni, Mannheim (DE); Celal Mohan Oeguen, Ludwigshafen am Rhein (DE); Tobias Baumgartner, Ludwigshafen am Rhein (DE); Michael Hanke, Ludwigshafen am Rhein (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 77 days.

(21) Appl. No.: 18/833,952

(22) PCT Filed: Feb. 24, 2023

(86) PCT No.: PCT/EP2023/054681
§ 371 (c)(1),
(2) Date: Jul. 29, 2024

(87) PCT Pub. No.: WO2023/161416
PCT Pub. Date: Aug. 31, 2023

(65) Prior Publication Data
US 2025/0164315 A1      May 22, 2025

(30) Foreign Application Priority Data

Feb. 25, 2022      (EP) ..................................... 22158719

(51) Int. Cl.
G01J 3/42 (2006.01)
G01J 3/02 (2006.01)
G01J 3/10 (2006.01)

(52) U.S. Cl.
CPC ............... G01J 3/42 (2013.01); G01J 3/0232 (2013.01); G01J 3/0272 (2013.01);
(Continued)

(58) Field of Classification Search
CPC .... G01J 3/28; G01J 3/42; G01J 3/0208; G01J 3/10; G01J 3/0218; G01J 3/02;
(Continued)

(56) References Cited

U.S. PATENT DOCUMENTS 5,866,899 A * 2/1999 Hossain .................. H01J 49/40
378/207
8,440,959 B2 * 5/2013 Nelson ................. A61B 5/0059
250/252.1
(Continued)

FOREIGN PATENT DOCUMENTS

WO          2017040431 A1     3/2017
WO          WO-2018078384 A1 * 5/2018 ................ G01J 3/08
(Continued)

OTHER PUBLICATIONS

International Search Report for PCT/EP2023/054681 dated May 8, 2023, 3 pages.
(Continued)

*Primary Examiner* — Michael P Stafira
(74) *Attorney, Agent, or Firm* — Armstrong Teasdale LLP

(57)          ABSTRACT

Disclosed herein is a method of calibrating a spectral sensing device. The spectral sensing device includes:
  a. at least one detector element;
  b. at least one wavelength-selective element;
  c. at least one light source:
  d. at least one sample interface;
  e. at least one first optical path; and
  f. at least one second optical path.
The method includes:
  I. illuminating the detector element via the at least one first optical path;
  II. illuminating the detector element via the at least one second optical path with no sample applied to the sample interface;

(Continued)

III. illuminating the detector element via the at least one second optical path with at least one calibration sample applied to the sample interface; and IV. determining at least one item of calibration information by using the first detector signal, the open port detector signal and the calibration detector signal.

Further disclosed herein are a method of determining at least one calibrated optical property of at least one sample, a spectral sensing device and computer programs and computer-readable storage media for performing the methods.

15 Claims, 5 Drawing Sheets

(52) U.S. Cl.
CPC .............. *G01J 3/0297* (2013.01); *G01J 3/10* (2013.01); *G01J 2003/106* (2013.01)

(58) Field of Classification Search
CPC ........ G01J 3/021; G01J 3/2803; G01J 3/2823; G01J 3/45; G01J 3/0291; G01J 3/0286; G01J 3/18; G01J 3/0205; G01J 3/0256; G01J 3/36; G01J 2003/2826; G01J 3/0297; G01J 2003/2866; G01J 3/0202; G01J 3/4531; G01J 3/0229; G01J 3/26; G01J 3/0264; G01J 2003/102; G01J 3/443; G01J 3/06; G01J 3/12; G01J 2003/106; G01J 3/0232; G01J 5/0806; G01J 3/027; G01J 3/0272; G01J 3/14; G01J 2005/0077; G01J 3/433; G01J 3/4535; G01J 5/0014; G01J 3/0294; G01J 3/44; G01J 3/08; G01J 3/108; G01J 5/53; G01J 3/32; G01J 2003/064; G01J 3/0289; G01J 3/04; G01J 3/453; G01J 3/0237; G01J 9/0246; G01J 3/0254; G01J 3/4532; G01J 2003/1226; G01J 2003/4538; G01J 3/1804; G01J 5/602; G01J 2003/104; G01J 2003/425; G01J 1/4257; G01J 2003/1247; G01J 2003/2869; G01J 2005/604; G01J 3/1809; G01J 3/4338; G01J 4/00; G01J 5/0814; G01J 5/0896; G01J 2003/062; G01J 2003/1213; G01J 2003/451; G01J 3/4412; G01J 3/51; G01J 2003/2813; G01J 3/0216; G01J 3/4406; G01J 9/00; G01J 2003/1828; G01J 3/0227; G01J 3/0243; G01J 3/0259; G01J 3/0278; G01J 3/447; G01J 3/457; G01J 9/02; G01J 1/04; G01J 2003/2879; G01J 2003/4424; G01J 2003/4534; G01J 2009/0257; G01J 3/524; G01J 2003/282; G01J 3/0235; G01J 3/0262; G01J 3/0275; G01J 3/50; G01J 5/0804; G01J 5/80; G01J 1/0295; G01J 1/0425; G01J 2001/0481; G01J 2001/4266; G01J 2003/283; G01J 3/0213; G01J 3/0283; G01J 3/463; G01J 3/502; G01J 3/504; G01J 3/513; G01J 5/60; G01J 1/0411; G01J 1/42; G01J 2003/1204; G01J 2003/1208; G01J 2003/1282; G01J 2003/2836; G01J 3/20; G01J 3/22; G01J 3/427; G01J 5/0801; G01J 5/52; G01J 1/0414; G01J 1/08; G01J 1/44; G01J 2003/1823; G01J 2003/1861; G01J 2003/2873; G01J 2003/423; G01J 2005/607; G01J 3/0221; G01J 3/0248; G01J 3/465; G01J 3/501; G01J 3/52; G01J 5/24; G01J 1/0242; G01J 1/06; G01J 1/4228; G01J 1/429; G01J 2001/086; G01J 2001/444; G01J 2003/1217; G01J 2003/2806; G01J 2003/2859; G01J 2005/066; G01J 3/00; G01J 3/0224; G01J 3/46; G01J 3/508; G01J 5/0003; G01J 5/0022; G01J 5/02; G01J 5/041; G01J 5/061; G01J 5/068; G01J 5/10; G01J 5/22; G01J 5/46; G01J 5/58; G01J 5/59; G01J 5/90; G01J 1/00; G01J 1/0492; G01J 1/10; G01J 1/36; G01J 11/00; G01J 2001/442; G01J 2003/1234; G01J 2003/1239; G01J 2003/1286; G01J 2003/4435; G01J 2009/0226; G01J 2009/023; G01J 2009/0261; G01J 2009/0265; G01J 3/024; G01J 3/0251; G01J 3/067; G01J 3/1256; G01J 3/1838; G01J 3/1895; G01J 3/2889; G01J 3/40; G01J 3/462; G01J 3/505; G01J 4/02; G01J 5/00; G01J 5/08; G01J 5/0821; G01J 9/04

See application file for complete search history.

(56) References Cited

U.S. PATENT DOCUMENTS

| | | | | |
|---|---|---|---|---|
| 9,052,239 | B2 * | 6/2015 | Zanni ...................... | G01J 3/433 |
| 2010/0084544 | A1 * | 4/2010 | Tallavarjula ...... | H01J 37/32972 |
| | | | | 250/252.1 |
| 2011/0085164 | A1 * | 4/2011 | Nelson ...................... | G01J 3/42 |
| | | | | 250/252.1 |
| 2012/0236305 | A1 * | 9/2012 | Zanni ...................... | G01J 3/433 |
| | | | | 356/326 |
| 2020/0116643 | A1 * | 4/2020 | Kun ...................... | H01S 3/0085 |
| 2021/0025755 | A1 * | 1/2021 | Knobbe ............... | G01J 3/0286 |

FOREIGN PATENT DOCUMENTS

| | | | |
|---|---|---|---|
| WO | 2018203831 | A1 | 11/2018 |
| WO | 2021042120 | A1 | 3/2021 |

OTHER PUBLICATIONS

Written Opinion for PCT/EP2023/054681 dated May 8, 2023, 7 pages.

* cited by examiner

METHOD OF CALIBRATING A SPECTRAL SENSING DEVICE

CROSS-REFERENCE TO RELATED APPLICATIONS

This application is a U.S. National Phase Application of International Patent Application No. PCT/EP23/54681, filed Feb. 24, 2023, and claims priority to European Patent Application No. 22158719.9, filed Feb. 25, 2022, each of which are hereby incorporated by reference herein.

TECHNICAL FIELD

The present invention relates to a method of calibrating a spectral sensing device, to a method of determining at least one calibrated optical property of at least one sample and to a spectral sensing device. The invention further relates to computer programs and computer-readable storage media for performing the methods. Such methods and devices can, in general, be used for investigating and/or monitoring purposes in the infrared spectral region, specifically in the near infrared and the mid infrared spectral regions. However, further applications, for example in the visible spectral regions, are also feasible.

BACKGROUND ART

In general, spectral sensing devices are known to collect information on the spectral light composition from an object, when irradiating, reflecting and/or absorbing light. As an example, WO 2021/042120 A1 discloses an optical measurement device including a light source, an emission optic configured to direct a first portion of light generated by the light source to a measurement target, a collection optic configured to receive light from the measurement target, an optical conduit configured to direct a second portion of light generated by the light source to a spectral reference, the spectral reference, a sensor and a filter. A first portion of the filter may be provided between the collection optic and a first portion of the sensor. A second portion of the filter may be provided between the spectral reference and a second portion of the sensor.

In order to allow comparing spectra from multiple spectral sensing devices, the spectral sensing devices have to be calibrated. In general, calibration of spectral sensing devices involves using known calibration standards. A typical process in the field of spectroscopy comprises calibrating the spectral sensing device to a known calibration standard with regard to the wavelength dependent sensitivity of the spectral sensing device's detector. This can be generally done on a regular basis, from time to time and/or before measuring an object. The calibration may specifically compensate drifts in the spectral sensing device components, which can be caused by internal and/or external physical changes, such as degradation of light sources and/or detectors, temperature drifts of light sources and/or detectors, temperature changes in an environment and/or in the system, for example temperature changes in electronic components such as readout circuits, mechanical extension and/or contraction of components, for example of mechanical housings, holders and/or optical components, such as dispersing elements, prisms, gratings etc. Drift effects may, if not corrected via calibration, distort measurement data, specifically such that measurement results become inconclusive.

As an example, WO 2018/203831 A1 describes a method of calibrating a spectrometer module including performing measurements using the spectrometer module to generate wavelength-versus-operating parameter calibration data for the spectrometer module, performing measurements using the spectrometer module to generate optical crosstalk and dark noise calibration data for the spectrometer module, and performing measurements using the spectrometer module to generate full system response calibration data, against a known reflectivity standard, for the spectrometer module. The method further includes storing in memory, coupled to the spectrometer module, a calibration record that incorporates the wavelength-versus-operating parameter calibration data, the optical crosstalk and dark noise calibration data, and the full system response calibration data, and applying the calibration record to measurements by the spectrometer module.

WO 2017/040431 A1 discloses systems and methods for measuring a concentration and type of substance in a sample at a sampling interface. The systems includes a light source, one or more optics, one or more modulators, a reference, a detector, and a controller. The systems and methods disclosed can be capable of accounting for drift originating from the light source, one or more optics, and the detector by sharing one or more components between different measurement light paths. Additionally, the systems can be capable of differentiating between different types of drift and eliminating erroneous measurements due to stray light with the placement of one or more modulators between the light source and the sample or reference. Furthermore, the systems can be capable of detecting the substance along various locations and depths within the sample by mapping a detector pixel and a microoptics to the location and depth in the sample.

However, detectors of the spectral sensing device, in particular infrared detectors, may be unstable and may drift due to varying operating conditions, such as temperature and/or humidity. Additionally, detectors may show hysteresis with time. In order to compensate for these drift effects, detectors may be temperature-stabilized, such as by cooling the detectors with the help of thermoelectric coolers to stabilize temperature, in order to reduce adverse drift effects. However, this may result in spectral sensing devices being bulky, complex and/or not cost sensitive.

Further, in particular radiation sources such as infrared radiation sources may degrade with time and/or use. Thus, spectral sensing devices may typically be calibrated with known reference standards before every measurement. Calibrating the spectral sensing device may involve light calibrations and/or dark calibrations. In particular, different types of calibration measurements may be performed which require either a pre-defined reflection target or an empty radiation path in front of the spectral sensing device such that no reflected radiation reaches the detector. For the dark calibration to re-calibrate the "dark current", "dark noise" and/or "dark resistance", no calibration target may be required. The light source may be turned off for "dark" measurements. The "light" calibration may comprise calibrating the wavelength dependent sensitivity of the photo-sensitive detectors. In particular, for the reflection spectroscopy, calibration measurements may be performed by employing a known reference standard with a predefined reflection spectrum to guarantee a known and reproducible calibration signal. The calibration standard may be positioned in a radiation path of the detector similar to a normal measurement object. For calibration of the spectral sensing device, the user may be responsible for positioning the calibration standard and/or for removing any objects in the sensing range of the spectral sensing device. Additionally, re-calibration to eliminate the hysteresis effects with a known external calibration target may be not very feasible in handheld spectral sensing devices and degrades the user experience since the user is required to be involved during the calibration process. Furthermore, since detector devices may generally have characteristic differences, such as temperature coefficients for resistance, responsivity and/or sensitivity, it may be challenging to use designated reference detectors and to use measurement signals from this reference detectors to correct and/or calibrate other detector devices.

Problem to be Solved

It is therefore desirable to provide methods and devices which at least partially address above-identified technical challenges regarding the calibration of spectral sensing devices. Specifically, methods, a spectral sensing device and computer programs and computer-readable storage media shall be proposed which allow for an easy, cost-effective, user-friendly and automated calibration of spectral sensing devices, in particular without a need for a calibration standard.

SUMMARY

This problem is addressed by a method of calibrating a spectral sensing device, a method of determining at least one calibrated optical property of at least one sample and a spectral sensing device with the features of the independent claims. This problem is further addressed by computer programs and computer-readable storage media for performing said methods. Advantageous embodiments which might be realized in an isolated fashion or in any arbitrary combinations are listed in the dependent claims as well as throughout the specification.

In a first aspect of the present invention, a method of calibrating a spectral sensing device is disclosed.

The term "spectral sensing device" as used herein is a broad term and is to be given its ordinary and customary meaning to a person of ordinary skill in the art and is not to be limited to a special or customized meaning. The term specifically may refer, without limitation, to a device capable of optically analyzing at least one sample, thereby generating at least one item of information on at least one spectral property of the sample. Specifically, the term may refer to a device which is capable of recording a signal intensity with respect to a corresponding wavelength of a spectrum or a partition thereof, such as a wavelength interval, wherein the signal intensity may, preferably, be provided as an electrical signal which may be used for further evaluation. An optical element, specifically comprising at least one wavelength-selective element, such as an optical filter and/or a dispersive element, may be used for separating incident light into a spectrum of constituent wavelength components whose respective intensities are determined by employing at least one detector element. In addition, further optical elements may be used which can be designed for receiving incident light and transferring the incident light to the optical element. The one or more elements of the spectral sensing device may be accommodated in a housing of the spectral sensing device. The spectral sensing device, generally, may be operable in a reflective mode and/or may be operable in a transmissive mode. The spectral sensing device may specifically be or may comprise at least one spectrometer device. For possible embodiments of the spectral sensing device, reference is made to the description of the spectral sensing device as will be outlined in further detail below.

The term "calibrating", also referred to as "calibration", as used herein is a broad term and is to be given its ordinary and customary meaning to a person of ordinary skill in the art and is not to be limited to a special or customized meaning. The term specifically may refer, without limitation, to a process of at least one of determining, correcting and adjusting measurement inaccuracies at the spectral sensing device. Thus, the calibration process may comprise determining at least one item of calibration information, which may comprise at least one item of information on a result of the calibration process, such as a calibration function, a calibration factor, a calibration matrix or the like, and may be used for transforming one or more measured values into one or more calibrated or "true" values. Measurement inaccuracies may, as an example, arise from uncertainties in wavelength determination and/or from intrinsic and/or extrinsic interferences on measurement signals of the spectral sensing device. Thus, calibrating the spectral sensing device may comprise at least one of a wavelength calibration, a stray light calibration and a dark current calibration. The calibration may comprise at least one two-step process, wherein, in a first step, information on a deviation of a measurement signal of the spectral sensing device from a known standard is determined, wherein, in a second step, this information is used for correcting and/or adjusting the measurement signal of the spectral sensing device in order to reduce, minimize and/or eliminate the deviation. Thus, the calibration may comprise applying the item of calibration information, for example to a measurement signal and/or to a measurement spectrum of the spectral sensing device. A calibration of the spectral sensing device may improve and/or maintain accuracy of measurements performed with the calibrated spectral sensing device.

The spectral sensing device comprises:
  a. at least one detector element configured for generating at least one detector signal in response to an illumination of the detector element by incident light;
  b. at least one wavelength-selective element configured for transferring incident light within at least one selected wavelength range onto the detector element;
  c. at least one light source configured for emitting light in at least one optical spectral range;
  d. at least one sample interface configured for allowing light from the light source to illuminate at least one sample and configured for allowing light from the sample to propagate via the wavelength-selective element to the detector element;
  e. at least one first optical path, wherein the first optical path is configured for allowing light emitted from the light source to propagate via the wavelength-selective element to the detector element without passing the sample interface; and
  f. at least one second optical path, wherein the second optical path is configured for allowing light emitted from the light source to propagate via the wavelength-selective element to the detector element by passing the sample interface at least once.

The method as proposed herein specifically may comprise calibrating the at least one spectral sensing device as described above. Additionally or alternatively, the method may also comprise providing at least one spectral sensing device as described above. The spectral sensing device may also comprise one or more additional components which are not described herein.

The term "detector element" as used herein is a broad term and is to be given its ordinary and customary meaning to a person of ordinary skill in the art and is not to be limited to a special or customized meaning. The term specifically may refer, without limitation, to an arbitrary device or combination of devices capable of recording and/or monitoring incident light. The detector element may be responsive to incident light and may be configured for generating an electrical signal indicating an intensity of incident light. For example, the detector element may comprise at least one photosensitive element having at least one photosensitive area configured for recording a photoresponse by generating at least one output signal that depends on an intensity of the incident light impinging on the photosensitive area. The detector element may be sensitive in one or more of a visible spectral range, an ultraviolet spectral range or the infrared spectral range, specifically a near infrared spectral range (NIR). The detector element specifically may be or may comprise at least one optical sensor, e.g. an optical semiconductor sensor. As an example, specifically in case the detector element is sensitive in the infrared spectral range, such as in the near infrared spectral range, the semiconductor sensor may be or may comprise at least one semiconductor sensor comprising at least one material selected from the group consisting of Si, PbS, PbSe, InGaAs, and extended-InGaAs. As an example, the detector element may comprise at least one photodetector such as at least one CCD or CMOS device. The detector element specifically may comprise at least one detector array comprising a plurality of pixelated sensors, wherein each of the pixelated sensors is configured to detect at least a portion of the incident light. Alternatively or additionally, the detector element may comprise a single photosensitive element being responsive in a broad spectral range, such as in one or more of a visible spectral range, an ultraviolet spectral range and an infrared spectral range.

The term "detector signal" as used herein is a broad term and is to be given its ordinary and customary meaning to a person of ordinary skill in the art and is not to be limited to a special or customized meaning. The term specifically may refer, without limitation, to a signal generated by at least one detector, specifically to the electrical signal of the detector element, more specifically to the at least one output signal of the photosensitive element. The at least one detector signal may be an analogue signal and/or a digital signal. In addition, the detector element, specifically the individual photosensitive elements, may comprise active pixel sensors which may be adapted to amplify the output signals prior to providing them as detector signals to an internal or external evaluation unit. For this purpose, the detector element, specifically the photosensitive element, may comprise one or more signal processing devices, such as one or more filters and/or analogue-digital-converters for processing and/or pre-processing the electronic signals. As another example, specifically in case of the option of the detector element comprising a single photosensitive element and in combination with the option of the wavelength-selective element comprising an optical interferometer, as will be outlined in further detail below, the detector element may comprise a signal processing device configured for performing a Fourier-transformation of the photoresponse of the single photosensitive element to obtain the detector signal.

The detector element may specifically be configured for generating the detector signal in response to the illumination by incident light transferred onto the detector element by the wavelength-selective element, in particular by incident light within the selected wavelength range. The term "illumination" as used herein is a broad term and is to be given its ordinary and customary meaning to a person of ordinary skill in the art and is not to be limited to a special or customized meaning. The term specifically may refer, without limitation, to an amount or an intensity of light impinging a certain area, specifically a photosensitive area of the detector element.

The term "wavelength-selective element" as used herein is a broad term and is to be given its ordinary and customary meaning to a person of ordinary skill in the art and is not to be limited to a special or customized meaning. The term specifically may refer, without limitation, to an arbitrary element or a combination of elements suitable for one or more of transmitting, reflecting, deflecting or scattering light in a wavelength dependent manner. The wavelength-selective element may specifically be configured for wavelength-dependent transfer by spatially separating incident light having different wavelengths. For example, the wavelength-selective element may be configured for separating incident light into a spectrum of constituent wavelength components and for transmitting wavelength components within the selected wavelength range onto the detector element. Thus, in this example, the wavelength-dependent transmission, reflections, deflection or scattering of incident light at the wavelength-selective element may result in a spatial separation of incident light. Alternatively or additionally, the wavelength-selective element may be configured for wavelength-dependent transfer by decreasing intensities of light having wavelengths outside the selected wavelength range, such as by using a filter element, specifically a narrow band pass filter. The wavelength selective element may be selected from the group consisting of: a prism; a grating; a linear variable filter; an optical filter, specifically a narrow band pass filter. Alternatively or additionally, the wavelength-selective element may comprise at least one optical interferometer configured for enabling superposition of incident light to cause an effect of interference of the superimposed light. Specifically, the optical interferometer may be configured for splitting incident light into at least two light beams and, further, for causing a phase shift of the split light beams relative to each other. The optical interferometer may further be configured for combining the phase shifted light beams such that the light beams superimpose and interfere with each other. For example, the optical interferometer may be or may comprise at least one of a Michelson interferometer and a Fabry-Pérot interferometer or the like. Thus, in this example, the wavelength-selective element may be configured for transmitting light within the at least one selected wavelength range by causing interference of the superimposed light at the optical interferometer.

Consequently, the term "selected wavelength range", as used herein, may refer, without limitation, to a wavelength interval of light, which is transferred by the wavelength-selective element onto the detector element, such as by one or more of transmitting, reflecting, deflecting or scattering light in a wavelength dependent manner.

As outlined above, the spectral sensing device comprises the at least one light source configured for emitting light in the optical spectral range. The term "light" as used herein is a broad term and is to be given its ordinary and customary meaning to a person of ordinary skill in the art and is not to be limited to a special or customized meaning. The term specifically may refer, without limitation, to a partition of electromagnetic radiation which is, usually, referred to as "optical spectral range" and which comprises one or more of a visible spectral range, an ultraviolet spectral range and an infrared spectral range. The terms "ultraviolet spectral range" or "UV" may, generally, refer to electromagnetic radiation having a wavelength of 1 nm to 380 nm, preferably of 100 nm to 380 nm. The term "visible spectral range" may, generally, refer to a wavelength of 380 nm to 760 nm. The terms "infrared spectral range" or "IR" may, generally, refer to a wavelength of 760 nm to 1000 μm, wherein a wavelength of 760 nm to 3 μm may, usually, be denominated as "near infrared spectral range" or "NIR", while the wavelength of 3μ to 15 μm may, usually, be denoted as "mid infrared spectral range" or "MidIR", and the wavelength of 15 μm to 1000 μm as "far infrared spectral range" or "FIR".

The term "light source" as used herein is a broad term and is to be given its ordinary and customary meaning to a person of ordinary skill in the art and is not to be limited to a special or customized meaning. The term specifically may refer, without limitation, to an arbitrary device configured for emitting light in one or more of the visible spectral range, the infrared spectral range and the ultraviolet spectral range. Specifically, the light source may be configured for emitting light in the infrared spectral range, e.g. light having a wavelength of 760 nm to 100 μm, more specifically light in the near infrared spectral range, e.g. light having a wavelength of 760 nm to 3 μm. The light source may be configured for simultaneously emitting light having different wavelengths, such that the light source may be configured for emitting white light. As an example, the light source may be or may comprise at least one light emitting diode (LED). Other options, however, such as thermal emitters, for example an incandescent lamp or a thermal infrared emitter, or blackbody radiators are also feasible. Alternatively or additionally, the light source may comprise a monochromatic light source configured for emitting monochromatic light in one or more of the visible spectral range, the infrared spectral range and the ultraviolet spectral range. Specifically, in case of the option of the wavelength-selective element comprising the optical interferometer, the light source may comprise such a monochromatic light source.

The term "sample interface" as used herein is a broad term and is to be given its ordinary and customary meaning to a person of ordinary skill in the art and is not to be limited to a special or customized meaning. The term specifically may refer, without limitation, to a port of the spectral sensing device, specifically of the spectrometer device, through which light in the optical spectral range, such as in at least one partition of the optical spectral range or in the full optical spectral range, may enter the spectral sensing device, specifically for the purpose of the spectral sensing, and/or may leave the spectral sensing device, e.g. for the purpose of illuminating the at least one object. The sample interface, as an example, may define an optical plane, e.g. a plane either material or imaginary, of the spectral sensing device, through which the light from the second optical path, as will be explained in further detail below, may travel to reach the object and/or through which the reflected light from the object may travel to reach the detector, e.g. to generate a second detector signal. The sample interface may or may not be constituted by a physical element and/or barrier, such as a transparent element, e.g. a glass or quartz window. The sample interface may also be the sample surface itself or a plane where the sample can be placed or aligned. As an example, the sample interface may be or may comprise at least one element comprising at least one transparent material being at least partially transparent in the optical spectral range, such as in at least one partition of the optical spectral range or in the full optical spectral range. The sample interface may be configured for transmitting light in the optical spectral range. The sample interface may be arranged in an optical path of the spectral sensing device, specifically in the second optical path, to allow light emitted from the light source to illuminate a sample placed in front of the spectral sensing device, specifically in front of the sample interface. The transparent material may, as an example, comprise one or more of a glass material, such as silica, soda lime, borosilicate or the like, and/or a polymeric material, such as polymethylmethacrylate or polystyrene.

The term "sample" as used herein is a broad term and is to be given its ordinary and customary meaning to a person of ordinary skill in the art and is not to be limited to a special or customized meaning. The term specifically may refer, without limitation, to an arbitrary object or element, chosen from a living object or a non-living object, and having at least one optical property, the determination of the optical property, preferably, being of interest to a user when using the spectral sensing device. The sample may be suitable for interfacing with the spectral sensing device, specifically with the sample interface.

As outlined above, the spectral sensing device comprises the at least one first optical path and the at least one second optical path. The term "optical path" as used herein is a broad term and is to be given its ordinary and customary meaning to a person of ordinary skill in the art and is not to be limited to a special or customized meaning. The term specifically may refer, without limitation, to a trajectory of light in the spectral sensing device. The optical path of light in the spectral sensing device may be affected by reflection, refraction, dispersion and/or absorption at one or more optical elements, such as lenses, prisms, mirrors, gratings or the like, comprised by the spectral sensing device. The terms "first" and "second", as generally used herein, are used for nomenclature, only, without implying any ranking or numbering.

The term "first optical path" as used herein is a broad term and is to be given its ordinary and customary meaning to a person of ordinary skill in the art and is not to be limited to a special or customized meaning. The term specifically may refer, without limitation, to an optical path without sample interaction. Specifically, a detector signal obtained via the first optical path may be unaffected from a presence and/or an absence of a sample at the spectral sensing device. For example, a detector signal obtained via the first optical path having a sample applied to the spectral sensing device may be equal to a detector signal obtained via the first optical path having no sample applied to the spectral sensing device, specifically assuming constant environmental conditions. In particular, as outlined above, the first optical path is configured for allowing light emitted from the light source to propagate via the wavelength-selective element to the detector element without passing the sample interface, specifically without being reflected at the sample. Via the first optical path, light emitted from the light source may be passed to the wavelength-selective element and subsequently to the detector element without interacting with the sample. The first optical path may be arranged completely in the spectral sensing device, such as within a housing of the spectral sensing device. Light following the first optical path may be emitted by the light source and may be directly or indirectly, such as by reflection, refraction and/or dispersion, guided to the wavelength-selective element and subsequently to the detector element. As an example, the first optical path may comprise a fiber coupled optical path transferring light from the light source to the detector element. The detector element may be configured for generating at least one detector signal in response to an illumination by incident light via the first optical path.

The term "second optical path" as used herein is a broad term and is to be given its ordinary and customary meaning to a person of ordinary skill in the art and is not to be limited to a special or customized meaning. The term specifically may refer, without limitation, to an optical path with sample interaction. Specifically, a detector signal obtained via the second optical path may be affected from a presence and/or an absence of a sample at the spectral sensing device. For example, a detector signal obtained via the second optical path having a sample applied to the spectral sensing device may be different from a detector signal obtained via the second optical path having no sample applied to the spectral sensing device, specifically irrespective of constant environmental conditions. In particular, the second optical path is configured for allowing light emitted from the light source to propagate via the wavelength-selective element to the detector element by passing the sample interface at least once. Specifically, the second optical path may allow light emitted from the light source to propagate to the sample interface and, subsequently, via the wavelength-selective element to the detector element. Via the second optical path, light emitted from the light source may be guided directly or indirectly, such as by reflection, refraction and/or dispersion, to the sample interface. The second optical path may be partially arranged outside the spectral sensing device, such as outside a housing of the spectral sensing device. Specifically, light in the second optical path may leave the spectral sensing device, in particular a housing of the spectral sensing device, at the sample interface to illuminate the sample arranged outside the spectral sensing device. The second optical path may be configured for coupling light reflected at the sample back into the spectral sensing device. Light reflected at the sample interface may be guided directly or indirectly, such as by reflection, refraction and/or dispersion, to the wavelength-selective element and subsequently to the detector element. The reflection at the sample interface may comprise a diffuse reflection. Specifically, light in the second optical path illuminating the wavelength-selective element and subsequently the detector element may be diffusively reflected light. The detector element may be configured for generating at least one detector signal in response to an illumination by incident light via the second optical path.

The method comprises the following steps which, as an example, may be performed in the given order. It shall be noted, however, that a different order is also possible. Further, it is also possible to perform one, more than one or even all of the method steps once or repeatedly. Further, it is possible to perform two or more of the method steps simultaneously or in a timely overlapping fashion. The method may comprise further method steps which are not listed.

The method comprises:

I. illuminating the detector element via the at least one first optical path to obtain at least one first detector signal;

II. illuminating the detector element via the at least one second optical path with no sample applied to the sample interface to obtain at least one open port detector signal;

III. illuminating the detector element via the at least one second optical path with at least one calibration sample applied to the sample interface to obtain at least one calibration detector signal; and IV. determining at least one item of calibration information by using the first detector signal, the open port detector signal and the calibration detector signal.

The term "illuminating" as used herein is a broad term and is to be given its ordinary and customary meaning to a person of ordinary skill in the art and is not to be limited to a special or customized meaning. The term specifically may refer, without limitation, to a process of at least one of providing, passing and guiding light onto a device or element to be illuminated. Specifically, the detector element may be illuminated with light via at least one of the first and the second optical path, wherein light emitted from the light source of the spectral sensing device may be guided onto the detector element. The illuminating may comprise directly illuminating the detector element, such as directly guiding the light emitted from the light source to the detector element without sample interaction, and/or indirectly illuminating the detector element, such as guiding the light emitted from the light source to the detector element with intermediate sample interaction. The illuminating of the detector element may comprise light reaching a photosensitive area of the detector element and, thus, may cause the detector element to generate the detector signal, for example an electronic signal indicative of the illumination of the detector element. The illuminating of the detector element may specifically comprise guiding light emitted from the light source via at least one of the first and the second optical path to the detector element.

The term "first detector signal" as used herein is a broad term and is to be given its ordinary and customary meaning to a person of ordinary skill in the art and is not to be limited to a special or customized meaning. The term specifically may refer, without limitation, to a detector signal obtained by illuminating the detector element via the first optical path. Thus, the first detector signal may be a detector signal without interaction with one or more of the sample interface and the sample. As outlined above, the term "first", as also used in the context of the detector signal, is used for the purpose of nomenclature rather than for the purpose of providing a ranking. Further, since the term is used for the purpose of nomenclature, only, the term does not imply the necessity of the presence of further elements of similar kind, such as in the present case the presence of a second detector signal.

The term "open port detector signal" as used herein is a broad term and is to be given its ordinary and customary meaning to a person of ordinary skill in the art and is not to be limited to a special or customized meaning. The term specifically may refer, without limitation, to a detector signal obtained by illuminating the detector element via the second optical path without having a sample applied to the sample interface.

The term "calibration detector signal" as used herein is a broad term and is to be given its ordinary and customary meaning to a person of ordinary skill in the art and is not to be limited to a special or customized meaning. The term specifically may refer, without limitation, to a detector signal obtained by illuminating the detector element via the second optical path having a calibration sample applied to the sample interface.

The term "item of calibration information" as used herein is a broad term and is to be given its ordinary and customary meaning to a person of ordinary skill in the art and is not to be limited to a special or customized meaning. The term specifically may refer, without limitation, to an arbitrary item of information suitable for calibrating a spectral sensing device. For example, the item of calibration information may comprise information on one or more of a wavelength calibration, a stray light calibration and a dark current calibration. The item of calibration information may be used for correcting, adjusting and/or compensating measurement inaccuracies at the spectral sensing device, such as due to internal and/or external physical changes of the spectral sensing device, for example degradation effects of the light source and/or the wavelength-selective element, and/or temperature changes.

The item of calibration information may comprise information on a first relation between the first detector signal and the calibration detector signal. The first relation may be given by $$S_{100\% \; Target,path2} = b * S_{path1}, \qquad \text{(Eq. 1)}$$

wherein $S_{100\% \; Target,path2}$ denotes the calibration detector signal and $S_{path1}$ denotes the first detector signal. The item of calibration information may specifically comprise the factor b in the first relation of equation 1. Further, the method may comprise in step v. determining the first relation, specifically determining factor b.

Additionally or alternatively, the item of calibration information may comprise information on a second relation between the first detector signal and the open port detector signal. The second relation may be given by $$S_{OpenPort,path2} = a * S_{path1}, \qquad \text{(Eq. 2)}$$

wherein $S_{OpenPort,path2}$ denotes the open port detector signal and $S_{path1}$ denotes the first detector signal. The item of calibration information may specifically comprise the factor a in the second relation of equation 2. Further, the method may comprise in step v. determining the second relation, specifically determining factor a.

The item of calibration information, specifically one or more of the first relation and the second relation, more specifically one or more of factors a and b, may be stored and may subsequently be used for calibration purposes, such as for calibrating measurements performed with the spectral sensing device.

In a further aspect of the present invention, a method of determining at least one calibrated optical property of at least one sample is disclosed.

The term "optical property" as used herein is a broad term and is to be given its ordinary and customary meaning to a person of ordinary skill in the art and is not to be limited to a special or customized meaning. The term specifically may refer, without limitation, to at least one item of information of a sample describing an interaction of the sample with light. The optical property may be probed by determining an interaction of the sample with light. The term "calibrated optical property" as used herein is a broad term and is to be given its ordinary and customary meaning to a person of ordinary skill in the art and is not to be limited to a special or customized meaning. The term specifically may refer, without limitation, to an optical property being transformed by using at least one item of calibration information. Specifically, the calibrated optical property may be corrected, adjusted and/or compensated for one or more measurement inaccuracies at the spectral sensing device, such as measurement inaccuracies arising from uncertainties in wavelength determination and/or from intrinsic and/or extrinsic interferences on measurement signals of the spectral sensing device. The calibrated optical property, as an example, may be an optical property of the sample which has been corrected, adjusted and/or compensated for drift effects on optical parts of the spectral sensing device, such as drift effects due to temperature and/or humidity variation at the detector element, degradation effects of the light source and/or other optical parts of the spectral sensing device. The calibrated optical property may be the result of the method of determining at least one calibrated optical property of at least one sample, wherein, specifically, the calibration may be performed simultaneously, such as in a timely overlapping fashion, and/or sequentially to a presence of the sample at the spectral sensing device.

The method comprises the following steps which, as an example, may be performed in the given order. It shall be noted, however, that a different order is also possible. Further, it is also possible to perform one, more than one or even all of the method steps once or repeatedly. Further, it is possible to perform two or more of the method steps simultaneously or in a timely overlapping fashion. The method may comprise further method steps which are not listed.

The method comprises:

i. providing the spectral sensing device as defined for the method of calibrating a spectral sensing device according to the present invention;

ii. providing the at least one sample, specifically providing the at least one sample to the sample interface;

iii. illuminating the detector element via the at least one first optical path to obtain at least one first detector signal;

iv. illuminating the detector element via the at least one second optical path to obtain at least one second detector signal; and v. determining the at least one calibrated optical property of the sample by using the first detector signal, the second detector signal and the at least one item of calibration information determined by using the method of calibrating a spectral sensing device according to the present invention, such as according to any one of the embodiments disclosed above and/or according to any one of the embodiments disclosed in further detail below.

As outlined above, the terms "first" and "second", as generally used herein, are used for the purpose of nomenclature rather than for the purpose of providing a ranking or for the purpose of an interrelation of the objects denoted by these terms.

The spectral sensing device used for the method of determining at least one calibrated optical property of at least one sample may be embodied identical or similar to the spectral sensing device used for the method of calibrating a spectral sensing device according to the present invention, such as according to any one of the embodiments described above. In fact, one and the same spectral sensing device may be used for both methods. However, other embodiments of the spectral sensing device provided in step i. are also feasible, for example according to any one of the embodiments of the spectral sensing device disclosed in further detail below.

The term "second detector signal" as used herein is a broad term and is to be given its ordinary and customary meaning to a person of ordinary skill in the art and is not to be limited to a special or customized meaning. The term specifically may refer, without limitation, to a detector signal obtained by illuminating the detector element via the second optical path. Thus, the second detector signal may be a detector signal with sample interaction at the sample interface.

The first detector signal obtained via the first optical path may be distinguished from the second detector signal obtained via the second optical path by using multiplexing methods. For example, the steps iii. and iv. may be performed using at least one multiplexing method selected from the group consisting of: a time multiplexing method; a frequency multiplexing method. Thus, in the method of determining at least one calibrated optical property of at least one sample, the calibration of the optical property, specifically taking into account drifting effects at the detector element, may be performed using the same detector element which is used for determining the optical property of the sample. In order to correct drifting effects of the detector element, at least two measurements using the same detector element may be performed. Thus, the multiplexing method may be used for distinguishing these two measurements, specifically for distinguishing the first detector signal from the second detector signal. A possible temporal drift between the at least two measurements, specifically between the obtaining of the first detector signal via the first optical path, which may be used as a reference measurement, and the obtaining of the second detector signal via the second optical path, which may be used as a sample measurement, may be avoided by using frequency multiplexing methods and/or minimized by using time multiplexing methods, specifically having a short and, thus, insignificant time delay.

For example, steps iii. and iv. may be performed at least partially in a timely overlapping fashion. Thus, the detector element may be simultaneously illuminated with light of the first optical path and the second optical path. The first detector signal and the second detector signal may be obtained simultaneously. The method may comprise, specifically in step v., distinguishing the first detector from the second detector signal. This can be done, as an example, by modulating the first detector signal and the second detector signal with a specific modulation frequency, specifically by frequency multiplexing. For example, light in the first optical path may be modulated with a first modulation frequency. Light in the second optical path may be modulated with a second modulation frequency. The first modulation frequency may be different from the second modulation frequency. The first and the second modulation frequencies may have no common higher order frequencies. For example, the first modulation frequency and the second modulation frequency may be prime numbers.

Alternatively or additionally, steps iii. and iv. may be performed consecutively. Step iv. may be performed with a time delay of no more than 1 s, specifically of no more than 100 ms, after step ii. The method may comprise, specifically in step v., distinguishing the first detector from the second detector signal. In this example, the first detector signal and the second detector signal may be obtained using time multiplexing. The time delay may be short, such as less than 1 s, specifically less than 100 ms, in order to minimize drift effects in between the two measurements.

The calibrated optical property of the sample may be one or more of an optical absorbance and an optical reflectivity of the sample. Thus, step v. may comprise deriving calibrated information on one or more of the optical absorbance and the optical reflectivity of the sample, such as information suitable for compensating drift effects on optical parts of the spectral sensing device, such as drift effects due to temperature and/or humidity variation at the detector element, degradation effects of the light source and/or other optical parts of the spectral sensing device.

The item of calibration information may be determined prior to step i. Thus, the item of calibration information used in step v. may be a predetermined item of calibration information. The item of calibration information may be determined, by way of example, prior to step i. by performing the method of calibrating a spectral sensing device according to the present invention, such as according to any one of the embodiments described above and/or according to any one of the embodiments disclosed in further detail below. Thus, the method of determining at least one calibrated optical property of at least one sample may comprise, specifically prior to step i., performing the method of calibrating a spectral sensing device according to the present invention, such as according to any one of the embodiments described above and/or according to any one of the embodiments disclosed in further detail below. Alternatively or additionally, the item of calibration information may be a re-determined item of calibration information, such as an item of calibration information determined in a re-calibration step as will be outlined in further detail below.

The calibrated optical property of the sample may specifically be an optical reflectivity of the sample $R_{Sample}$. In general, the optical reflectivity of the sample $R_{Sample}$ may be determined according to:

$$R_{Sample} = \frac{S_{Sample,path2} - S_{openPort,path2}}{S_{100\% \ Target,path2} - S_{openPort,path2}}, \tag{Eq. 3}$$

wherein $S_{Sample,path2}$ denotes a detector signal with sample interaction, $S_{100\% \ Target,path2}$ denotes a calibration detector signal, such as a detector signal obtained with a sample of known reflectivity, and $S_{OpenPort,path2}$ denotes an open port detector signal, such as a detector signal without having a sample applied to the sample interface.

The item of calibration information may comprise information on a first relation between the first detector signal and at least one calibration detector signal. The first relation may be given by $$S_{100\% \ Target,path2} = b * S_{path1}, \tag{Eq. 4}$$

wherein $S_{100\% \ Target,path2}$ denotes the calibration detector signal and $S_{path1}$ denotes the first detector signal. b may be a factor, $b \in \mathbb{R}$.

Additionally or alternatively, the item of calibration information may comprise information on a second relation between the first detector signal and at least one open port detector signal. The second relation may be given by $$S_{OpenPort,path2} = a * S_{path1}, \tag{Eq. 5}$$

wherein $S_{OpenPort,path2}$ denotes the open port detector signal and $S_{path1}$ denotes the first detector signal. a may be a factor, $a \in \mathbb{R}$.

Thus, considering equations 3 to 5, the calibrated optical property may be $$R_{Sample} = \frac{S_{Sample,path2} - a * S_{path1}}{c * S_{path1}}, \tag{Eq. 6}$$

wherein c=b−a, wherein $S_{path1}$ denotes the first detector signal and $S_{Sample,path2}$ denotes the second detector signal.

The method may further comprise a re-calibration step. The re-calibration step may comprise re-determining the item of calibration information. Specifically, the re-calibration may comprise re-determining at least one of the first relation and the second relation, specifically at least one of the factors a and b. For example, the re-calibration step may comprise an open port measurement by determining the first detector signal and the second detector signal without having the sample applied to the sample interface. The re-calibration may further comprise a measurement with a sample of known and constant reflectivity. Thus, factors a and b may be re-determined by using equations 4 and 5, respectively.

The spectral sensing device may specifically comprise a plurality of detector elements arranged in a detector array. The term "detector array" as used herein is a broad term and is to be given its ordinary and customary meaning to a person of ordinary skill in the art and is not to be limited to a special or customized meaning. The term specifically may refer, without limitation, to a regular arrangement of the plurality of detector elements. The plurality of detector elements may comprise at least two, specifically at least five, more specifically at least eight or even more, detector elements. The regular arrangement may comprise a geometric arrangement, such as a rectangular or quadratic matrix pattern or a linear pattern. However, other arrangements are also feasible. The detector array may be configured for generating detector signals for a plurality of different wavelengths. For example, the wavelength-selective element may be configured for transmitting different wavelengths onto the plurality of detector elements comprised by the detector array.

The method may comprise in step iii. obtaining a plurality of first detector signals for the plurality of detector elements and in step iv. obtaining a plurality of second detector signals for the plurality of detector elements. Step v. may be performed separately for each detector element of the plurality of detector elements. Thus, the item of calibration information may comprise information on the first relation and on the second relation for each detector element of the plurality of detector elements. In this example, equations 4, 5 and specifically equation 6 may be applied to each detector element of the plurality of detector elements separately.

In a further aspect of the present invention, a spectral sensing device is disclosed. The spectral sensing device comprises:

a. at least one detector element configured for generating at least one detector signal in response to an illumination of the detector element by incident light;

b. at least one wavelength-selective element configured for transferring incident light within at least one selected wavelength range onto the detector element;

c. at least one light source configured for emitting light in at least one optical spectral range;

d. at least one sample interface configured for allowing light from the light source to illuminate at least one sample and configured for allowing light from the sample to propagate via the wavelength-selective element to the detector element;

e. at least one first optical path, wherein the first optical path is configured for allowing light emitted from the light source to propagate via the wavelength-selective element to the detector element without passing the sample interface;

f. at least one second optical path, wherein the second optical path is configured for allowing light emitted from the light source to propagate via the wavelength-selective element to the detector element by passing the sample interface at least once; and g. at least one evaluation unit configured for determining at least one calibrated optical property of the sample by using the method of determining at least one calibrated optical property of at least one sample according to the present invention, such as according to any one of the embodiments disclosed above and/or according to any one of the embodiments disclosed in further detail below.

For definitions and embodiments with regard to the spectral sensing device and/or to the method, reference is made to the description of the method for calibrating a spectral sensing device as outlined above. The spectral sensing device may specifically be configured for performing the method of determining at least one calibrated optical property of at least one sample according to the present invention, such as according to any one of the embodiments disclosed above and/or according to any one of the embodiments disclosed in further detail below.

The term "evaluation unit" as used herein is a broad term and is to be given its ordinary and customary meaning to a person of ordinary skill in the art and is not to be limited to a special or customized meaning. The term specifically may refer, without limitation, to at least one data processing device, such as at least one processor, the at least one data processing device being configured for performing at least evaluation operation. Specifically, the evaluation unit may comprise at least one data processing device having a software code stored thereon comprising a number of computer commands. The evaluation unit may provide one or more hardware elements for performing one or more evaluation operations and/or may provide one or more processors with software running thereon for performing one or more evaluation operations. The evaluation operations may specifically comprise one or more of determining the at least one item of calibration information and determining the calibrated optical property. The evaluation unit may be configured for receiving and/or for retrieving detector signals from the detector element. The evaluation unit may specifically be configured for evaluating, such as by determining the at least one item of calibration information and determining the calibrated optical property, the received and/or retrieved detector signals. In particular, the evaluation unit may comprise one or more processors.

The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math co-processor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) and/or one or more tensor processing unit (TPU) and/or one or more chip, such as a dedicated machine learning optimized chip, or the like. The processor specifically may be configured, such as by software programming, for performing one or more evaluation operations.

The light source may be arranged to illuminate the first optical path and the second optical path. The spectral sensing device may further comprise at least one first optical modulator arranged in the first optical path and at least one second optical modulator arranged in the second optical path. The term "optical modulator" as used herein is a broad term and is to be given its ordinary and customary meaning to a person of ordinary skill in the art and is not to be limited to a special or customized meaning. The term specifically may refer, without limitation, to a device configured for varying one or more properties of light. The optical modulator may be configured for varying one or more of an amplitude, a frequency, a polarization and a phase of light. The first optical modulator may be configured for modulating light in the first optical path, for example by varying one or more of an amplitude, a frequency, a polarization and a phase of light in the first optical path. The second optical modulator may be configured for modulating light in the second optical path, for example by varying one or more of an amplitude, a frequency, a polarization and a phase of light in the second optical path. Specifically, the first optical modulator may be configured for modulating light with a first modulation frequency. The second optical modulator may be configured for modulating light with a second modulation frequency. For example, each of the first optical modulator and the second optical modulator may comprise at least one element selected from the group consisting of: a mechanical optical modular, specifically a chopper and/or a slit; an acousto-optic modulator; an electro-optic modulator; a spatial light modulator; a liquid crystal light modulator. The light source of the spectral sensing device may be arranged to illuminate both the first optical modulator in the first optical path and the second optical modulator in the second optical path.

Alternatively or additionally, the spectral sensing device may comprise two light sources. A first light source may be arranged to illuminate the first optical path. A second light source may be arranged to illuminate the second optical path. The spectral sensing device may further comprise at least one reflection element in the first optical path. The term "reflection element" as used herein is a broad term and is to be given its ordinary and customary meaning to a person of ordinary skill in the art and is not to be limited to a special or customized meaning. The term specifically may refer, without limitation, to an optical device configured for changing a direction of propagation of incident light. Specifically, the reflection element may be configured for changing a direction of propagation of incident light such that light reflected by the reflection element returns to a medium from which it originated. The reflection element may comprise at least one reflecting surface. The reflecting surface may be one or more of a metallic reflecting surface, for example comprising silver, tin, nickel, chromium, aluminum or any other metal or composition comprising at least one metal, and a reflecting polymer surface, for example comprising polytetrafluoroethylene. The first light source may be arranged to illuminate the reflection element. The reflection element may reflect incident light onto the wavelength-selective element. The reflection at the reflection element may be a specular reflection of light. The reflection at the reflection element may be a broadband reflection, specifically a uniform reflection for multiple wavelengths within at least one range of wavelengths.

Alternatively or additionally to the reflection element arranged in the first optical path, the first light source may be arranged in the first optical path to directly illuminate the wavelength-selective element.

The spectral sensing device may comprise a plurality of detector elements arranged in a detector array. The detector array may be a linear array of the plurality of detector elements or any other regular arrangement of the plurality of detector elements.

In a further aspect of the present invention, a computer program for calibrating a spectral sensing device is disclosed, comprising instructions which, when the computer program is executed by a computer or computer network, cause the computer or computer network to perform at least step IV. of the method of calibrating a spectral sensing device according to the present invention, such as according to any one of the embodiments disclosed above and/or according to any one of the embodiments disclosed in further detail below.

The computer program may further comprise instructions which, when the computer program is executed by the computer or computer network, cause the computer or computer network to control performing steps I. to III. of the method of calibrating a spectral sensing device according to the present invention, such as according to any one of the embodiments disclosed above and/or according to any one of the embodiments disclosed in further detail below.

Similarly, a computer-readable storage medium is disclosed, comprising instructions, which, when executed by a computer or computer network, cause the computer or computer network to perform at least step IV. of the method of calibrating a spectral sensing device according to the present invention, such as according to any one of the embodiments disclosed above and/or according to any one of the embodiments disclosed in further detail below.

As used herein, the term "computer-readable storage medium" specifically may refer to nontransitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

The computer-readable storage medium may further comprise instructions which, when executed by the computer or computer network, cause the computer or computer network to control performing steps I. to III. of the method of calibrating a spectral sensing device according to the present invention, such as according to any one of the embodiments disclosed above and/or according to any one of the embodiments disclosed in further detail below.

In a further aspect of the present invention, a computer program for determining at least one calibrated optical property of at least one sample is disclosed, comprising instructions which, when the computer program is executed by a computer or computer network, cause the computer or computer network to perform at least step v. of the method of determining at least one calibrated optical property of at least one sample according to the present invention, such as according to any one of the embodiments disclosed above and/or according to any one of the embodiments disclosed in further detail below.

The computer program may further comprise instructions which, when the computer program is executed by the computer or computer network, cause the computer or computer network to control performing steps iii. and iv. of the method of determining at least one calibrated optical property of at least one sample according to the present invention, such as according to any one of the embodiments disclosed above and/or according to any one of the embodiments disclosed in further detail below.

The computer program may further comprise instructions which, when the computer program is executed by the computer of computer network, cause the computer of computer network to prompt a user to perform steps i. and ii. of the method of determining at least one calibrated optical property of at least one sample according to the present invention, such as according to any one of the embodiments disclosed above and/or according to any one of the embodiments disclosed in further detail below.

Similarly, a computer-readable storage medium is disclosed, comprising instructions which, when executed by a computer or computer network, cause the computer or computer network to perform at least step v. of the method of determining at least one calibrated optical property of at least one sample according to the present invention, such as according to any one of the embodiments disclosed above and/or according to any one of the embodiments disclosed in further detail below.

The computer-readable storage medium may further comprise instructions which, when executed by the computer or computer network, cause the computer or computer network to control performing steps iii. and iv. of the method of determining at least one calibrated optical property of at least one sample according to the present invention, such as according to any one of the embodiments disclosed above and/or according to any one of the embodiments disclosed in further detail below.

The computer-readable storage medium may further comprise instructions which, when executed by the computer of computer network, cause the computer of computer network to prompt a user to perform steps i. and ii. of the method of determining at least one calibrated optical property of at least one sample according to the present invention, such as according to any one of the embodiments disclosed above and/or according to any one of the embodiments disclosed in further detail below.

The methods, the spectral sensing device and the computer programs and computer-readable storage media according to the present invention may provide a large number of advantages over known methods and devices. Specifically, the methods and the spectral sensing device according to the present invention may account for possible drift effects at the spectral sensing device, for example due to temperature and/or humidity variations, when determining the calibrated optical property of the sample and, thus, may avoid the need of a temperature stabilization unit at the detector element. Thus, the spectral sensing device may be easily miniaturized, for example to fit in a mobile device, such as smartphones, tablet device or any other handheld devices.

Further, the method of determining at least one calibrated optical property of at least one sample may avoid the need for user involvement when calibrating the spectral sensing device. For example, known calibration methods may comprise using external calibration standards for calibration purposes and/or performing separate calibration measurements without having a sample applied to the spectral sensing device. Using external calibration standards and/or performing separate calibration measurements may, generally, require user involvement to calibrate the spectral sensing device. Thus, by avoiding using external calibration standards and/or separate calibration measurements, the method of determining at least one calibrated optical property of at least one sample may allow for an easy and user-friendly operation of the spectral sensing device at the user's site while also ensuring precise measurement results, specifically without dedicated user involvement for the calibration of the spectral sensing device. Thus, the calibration performed in the methods according to the present invention may be performed completely automatically, specifically without user interaction.

Further, the method of determining at least one calibrated optical property of at least one sample, in contrast to known calibration methods, may be performed together, specifically simultaneously, with the sample measurement and, thus, may avoid the need for an additional calibration step. Specifically, as outlined above, the first detector signal and the second detector signal may be obtained in a timely overlapping fashion. Additionally, the first detector signal and the second detector signal may be obtained by using the same detector element which may specifically avoid using additional or extra reference detectors. The detector element may be used for both, the calibration measurement and the sample measurement, wherein the detector element for the calibration measurement may not receive any radiation from the sample such that the first detector signal may not depend on the presence or absence of any sample and, thus, can be used for calibration.

The spectral sensing device according to the present invention may comprise the at least one detector element, specifically at least one infrared detector, configured for detecting light within at least one selected wavelength range. This may be achieved by using the at least one wavelength selective element, such as an optical bandpass filter, an interferometer and/or a grating.

The spectral sensing device may further comprise the at least one light source and the at least two optical paths: The first optical path may not be affected by a presence or an absence of a sample. The second optical path may show different readings depending on a presence or an absence of a sample at the sample interface. Both, the first optical path and the second optical path may include a passage through the wavelength selective element in such a way that the detector element may detect the incident radiation only at the selected wavelength range.

An open port detector signal may refer to a detector signal being generated by radiation via the second optical path in absence of the sample. The open port detector signal may be indistinguishable from noise depending on the optical design of the second optical path. The first detector signal and the second detector signal generated by the detector element due to the radiation via the first optical path and the second optical path, respectively, may be differentiated by either time multiplexing and/or frequency multiplexing. The spectral sensing device with the two optical paths may be configured for compensating drift effects of the at least one detector element and/or the at least one light source due to warming up and/or changing material properties. Consequently, drift effects over time may be compensated by time multiplexing only within an acceptably small time interval between measurements or more preferably by frequency multiplexing. In frequency multiplexing, the detector element may be illuminated simultaneously via the first optical path and the second optical path but at different modulation frequencies. The thermal changes effecting the components of the spectral sensing device, for example of the detector element, the light source and/or read-out electronics, may be in principle identical. In time multiplexing, a time delay between two measurements via the first optical path and the second optical path may be short enough in order to minimize the drift effects.

The first optical path may contain the at least one reflection element, such as at least one internal reflection target of constant reflectivity. Alternatively, a direct illumination through the wavelength-selective element from the at least one light source may also be feasible. The first optical path may be designed for calibrating the at least one detector element. However, both optical paths may be different from each other and, thus, a first relation may be used to describe this difference at least once for the calibration. The first relation may be stored and may be used for further measurements. The first relation may be determined by determining the detector signal of an external calibration target of known reflectivity in the second optical path and the detector signal without sample interaction in the first optical path, specifically being multiplexed either in time or in frequency domain. Both detector signal may be compared analytically subsequently.

If the open port detector signal may be not negligible, meaning the first detector signal is not indistinguishable from noise, a second relation may be generated prior to any sample measurement at least once in the absence of the sample. The second relation may be updated from time to time in the absence of the sample.

The illumination through each of the first and the second optical path may be mechanically or more preferably electrically modulated either in frequency or in time domain. This may be realized by using at least two light sources, wherein both light sources may be covering the same wavelength range of interest or more preferably featuring the same spectrum, modulated sequentially or at the same time at different electrical frequencies. Alternatively or additionally, a single light source may be used together with at least two optical modulators. The optical modulators may be ports which can be opened and closed sequentially or at the same time at different frequencies. The illumination through the first optical modulator may follow the first optical path and the illumination through the second optical modulator may follow the second optical path before reaching the wavelength-selective element and, subsequently, the detector element.

The spectral sensing device may further comprise the evaluation unit, for example readout electronics to record the multiplexed detector signals via the two optical paths and to de-multiplex these detector signals, for example via Fourier Transform in case of frequency multiplexing.

In general, the reflectivity of a sample is given by:

$$R_{Sample} = \frac{S_{sample,path2}}{S_{100\% \ Target,path2}},$$ (Eq. 7)

wherein the $S_{100\% \ Target,path2}$ is the detector signal generated with a known external calibration target, for example of 100% reflectivity.

The open port detector signal may be not negligible and, thus, may be quantified and subtracted from the second detector signal via the second optical path in presence of the sample and the external calibration target of known reflectivity:

$$S_{Sample} = \frac{S_{sample,path2} - S_{OpenPort,path2}}{S_{100\% \ Target,path2} - S_{OpenPort,path2}}$$ (Eq. 8)

The device-internal reflectivity, which results in the open port detector signal, may be assumed to remain constant. Thus, the open port detector signal may only change due to changing characteristics of the detector element and/or the light source. This change in the detector signal may be quantified by determining, sequentially or in parallel, the first detector signal via the first optical path and the second detector signal via the second optical path using the same detector element. Analogously, a change of the second detector signal compared with a detector signal of a reflection sample with constant reflectivity may be quantified by means of the first detector signal via first optical path. These changes in the detector signals may both be expressed by means of the first detector signal via first optical path having constant optical properties, which may be determined with the same detector element and with the known first and second relations. These signals may therefore be expressed as:

$$S_{100\% \ Target,path2} = f(S_{path1})$$ (Eq. 9)

$$S_{OpenPort,path2} = g(S_{path1})$$ (Eq. 10)

The first and the second relation may comprise a mathematical relation comprising a factor, for example:

$$S_{100\% \ Target,path2} = b * S_{path1}$$ (Eq. 11)

$$S_{OpenPort,path2} = a * S_{path1}$$ (Eq. 12)

The result may be:

$$S_{Sample} = \frac{S_{Sample,path2} - a * S_{path1}}{b * S_{path1} - a * S_{path1}}$$ (Eq. 13)

The item of calibration information may comprise these coefficients or conversion factors a and b forming part of the first and the second relation. The item of calibration information may be determined in an initial calibration step using external reflection targets of known reflectivity and may be stored. Considering the first and the second relation of equations 11 and 12, the factors may be determined according to:

$$a = \frac{S_{OpenPort,path2}}{S_{path1}}$$ (Eq. 14)

$$b = \frac{S_{100\%Target,path2}}{S_{path1}}$$ (Eq. 15)

Assuming that the open port reflectance changes, for example, due to a dirty or scratched glass window, the factor a may be re-determined from time to time by performing an open port measurement without any user involvement. Similarly, factor b may be re-determined by using any other sample of known and constant reflectivity instead of a 100% reflectance target.

Using the first and the second relation, the correction, re-calibration and/or measurement may be performed only by means of the first detector signal $S_{path1}$ due to illumination of the detector element via the first optical path and the second detector signal $S_{Sample,path2}$ due to the reflection from the sample at the sample interface:

$$R_{Sample} = \frac{S_{Sample,path2} - a * S_{path1}}{b * S_{path1} - a * S_{path1}} \quad \text{(Eq. 16)}$$

The formula can be rewritten as:

$$R_{Sample} = \frac{S_{Sample,path2} - a * S_{path1}}{c * S_{path1}}, \quad \text{(Eq. 17)}$$

as long as the equation c=(b−a) is true.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, notwithstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

Summarizing and without excluding further possible embodiments, the following embodiments may be envisaged:

Embodiment 1: A method of calibrating a spectral sensing device, the spectral sensing device comprising:
a. at least one detector element configured for generating at least one detector signal in response to an illumination of the detector element by incident light;
b. at least one wavelength-selective element configured for transferring incident light within at least one selected wavelength range onto the detector element;
c. at least one light source configured for emitting light in at least one optical spectral range;

d. at least one sample interface configured for allowing light from the light source to illuminate at least one sample and configured for allowing light from the sample to propagate via the wavelength-selective element to the detector element;
e. at least one first optical path, wherein the first optical path is configured for allowing light emitted from the light source to propagate via the wavelength-selective element to the detector element without passing the sample interface;
f. at least one second optical path, wherein the second optical path is configured for allowing light emitted from the light source to propagate via the wavelength-selective element to the detector element by passing the sample interface at least once;
the method comprising:
I. illuminating the detector element via the at least one first optical path to obtain at least one first detector signal;
II. illuminating the detector element via the at least one second optical path with no sample applied to the sample interface to obtain at least one open port detector signal;
III. illuminating the detector element via the at least one second optical path with at least one calibration sample applied to the sample interface to obtain at least one calibration detector signal; and
IV. determining at least one item of calibration information by using the first detector signal, the open port detector signal and the calibration detector signal.

Embodiment 2: The method according to the preceding embodiment, wherein the item of calibration information comprises information on a first relation between the first detector signal and the calibration detector signal.

Embodiment 3: The method according to the preceding embodiment, wherein the first relation is given by $$S_{100\%Target,path2} = b * S_{path1},$$

wherein $S_{100\% \, Target,path2}$ denotes the calibration detector signal and $S_{path1}$ denotes the first detector signal.

Embodiment 4: The method according to the preceding embodiment, wherein the method comprises in step v. determining the first relation, specifically determining factor b.

Embodiment 5: The method according to any one of the preceding embodiments, wherein the item of calibration information comprises information on a second relation between the first detector signal and the open port detector signal.

Embodiment 6: The method according to the preceding embodiment, wherein the second relation is given by $$S_{OpenPort,path2} = a * S_{path1},$$

wherein $S_{OpenPort,path2}$ denotes the open port detector signal and $S_{path1}$ denotes the first detector signal.

Embodiment 7: The method according to the preceding embodiment, wherein the method comprises in step v. determining the second relation, specifically determining factor a.

Embodiment 8: A method of determining at least one calibrated optical property of at least one sample, the method comprising:

i. providing the spectral sensing device as defined in embodiment 1;

ii. providing the at least one sample, specifically providing the at least one sample to the sample interface;

iii. illuminating the detector element via the at least one first optical path to obtain at least one first detector signal;

iv. illuminating the detector element via the at least one second optical path to obtain at least one second detector signal; and v. determining the at least one calibrated optical property of the sample by using the first detector signal, the second detector signal and the at least one item of calibration information determined by using the method of calibrating a spectral sensing device according to any of the preceding embodiments.

Embodiment 9: The method according to the preceding embodiment, wherein the calibrated optical property of the sample is one or more of an optical absorbance and an optical reflectivity of the sample.

Embodiment 10: The method according to any one of the preceding embodiments referring to a method of determining at least one calibrated optical property of at least one sample, wherein steps iii. and iv. are performed using at least one multiplexing method selected from the group consisting of: a time multiplexing method; a frequency multiplexing method.

Embodiment 11: The method according to the preceding embodiment, wherein steps iii. and iv. are performed at least partially in a timely overlapping fashion.

Embodiment 12: The method according to the preceding embodiment, wherein light in the first optical path is modulated with a first modulation frequency, wherein light in the second optical path is modulated with a second modulation frequency.

Embodiment 13: The method according to the preceding embodiment, wherein the first modulation frequency and the second modulation frequency are prime numbers.

Embodiment 14: The method according to any one of the four preceding embodiments, wherein steps iii. and iv. are performed consecutively, wherein step iv. is performed with a time delay of no more than 1 s, specifically of no more than 100 ms, after step iii.

Embodiment 15: The method according to any one of the preceding embodiments referring to a method of determining at least one calibrated optical property of at least one sample, wherein the item of calibration information is determined prior to step i.

Embodiment 16: The method according to any one of the preceding embodiments referring to a method of determining at least one calibrated optical property of at least one sample, wherein the item of calibration information comprises information on a first relation between the first detector signal and at least one calibration detector signal.

Embodiment 17: The method according to the preceding embodiment, wherein the first relation is given by $$S_{100\%Target,path2} = b * S_{path1},$$

wherein $S_{100\% \ Target,path2}$ denotes the calibration detector signal and $S_{path1}$ denotes the first detector signal.

Embodiment 18: The method according to any one of the preceding embodiments referring to a method of determining at least one calibrated optical property of at least one sample, wherein the item of calibration information comprises information on a second relation between the first detector signal and at least one open port detector signal.

Embodiment 19: The method according to the preceding embodiment, wherein the second relation is given by $$S_{OpenPort,path2} = a * S_{path1},$$

wherein $S_{OpenPort,path2}$ denotes the open port detector signal and $S_{path1}$ denotes the first detector signal.

Embodiment 20: The method according to embodiments 18 and 20, wherein the calibrated optical property of the sample is an optical reflectivity of the sample $R_{Sample}$, wherein $$R_{Sample} = \frac{S_{Sample,path2} - a * S_{path1}}{c * S_{path1}},$$

wherein c=b−a, wherein $S_{path1}$ denotes the first detector signal and $S_{Sample,path2}$ denotes the second detector signal.

Embodiment 21: The method according to any one of the preceding embodiments referring to a method of determining at least one calibrated optical property of at least one sample, wherein the method further comprises a re-calibration step, wherein the re-calibration step comprises redetermining the item of calibration information.

Embodiment 22: The method according to the preceding embodiment, wherein the re-calibration step comprises re-determining at least one of a first relation and a second relation, specifically at least one of factors a and b.

Embodiment 23: The method according to any one of the preceding embodiments referring to a method of determining at least one calibrated optical property of at least one sample, wherein the spectral sensing device comprises a plurality of detector elements arranged in a detector array, wherein the method comprises in step iii. obtaining a plurality of first detector signals for the plurality of detector elements, wherein the method comprises in step iv. obtaining a plurality of second detector signals for the plurality of detector elements.

Embodiment 24: The method according to the preceding embodiment, wherein step v. is performed separately for each detector element of the plurality of detector elements.

Embodiment 25: A spectral sensing device comprising:

a. at least one detector element configured for generating at least one detector signal in response to an illumination of the detector element by incident light;

b. at least one wavelength-selective element configured for transferring incident light within at least one selected wavelength range onto the detector element;

c. at least one light source configured for emitting light in at least one optical spectral range;

d. at least one sample interface configured for allowing light from the light source to illuminate at least one sample and configured for allowing light from the sample to propagate via the wavelength-selective element to the detector element;

e. at least one first optical path, wherein the first optical path is configured for allowing light emitted from the light source to propagate via the wavelength-selective element to the detector element without passing the sample interface;

f. at least one second optical path, wherein the second optical path is configured for allowing light emitted from the light source to propagate via the wavelength-selective element to the detector element by passing the sample interface at least once; and g. at least one evaluation unit configured for determining at least one calibrated optical property of the sample by using the method of determining at least one calibrated optical property of at least one sample according to any one of the preceding embodiments referring to a method of determining at least one calibrated optical property of at least one sample.

Embodiment 26: The spectral sensing device according to the preceding embodiment, wherein the light source is arranged to illuminate the first optical path and the second optical path.

Embodiment 27: The spectral sensing device according to the preceding embodiment, wherein the spectral sensing device further comprises at least one first optical modulator arranged in the first optical path configured for modulating light in the first optical path and at least one second optical modulator arranged in the second optical path configured for modulating light in the second optical path.

Embodiment 28: The spectral sensing device according to the preceding embodiment, wherein the first optical modulator is configured for modulating light in the first optical path with a first modulation frequency, wherein the second optical modulator is configured for modulating light with a second modulation frequency.

Embodiment 29: The spectral sensing device according to any one of the two preceding embodiments, wherein each of the first optical modulator and the second optical modulator comprises at least one element selected from the group consisting of: a mechanical optical modular, specifically a chopper and/or a slit; an acousto-optic modulator; an electro-optic modulator; a spatial light modulator; a liquid crystal light modulator.

Embodiment 30: The spectral sensing device according to any one of the preceding embodiments referring to a spectral sensing device, wherein the spectral sensing device comprises two light sources, wherein a first light source is arranged to illuminate the first optical path, wherein a second light source is arranged to illuminate the second optical path.

Embodiment 31: The spectral sensing device according to the preceding embodiment, wherein the spectral sensing device further comprises at least one reflection element in the first optical path, wherein the first light source is arranged to illuminate the reflection element, wherein the reflection element reflects incident light onto the wavelength-selective element.

Embodiment 32: The spectral sensing device according to the preceding embodiment, wherein the reflection element comprises at least one reflecting surface, wherein the reflecting surface is one or more of a metallic reflecting surface and a reflecting polymer surface.

Embodiment 33: The spectral sensing device according to any one of the three preceding embodiments, wherein the first light source is arranged to directly illuminate the wavelength-selective element.

Embodiment 34: The spectral sensing device according to any one of the preceding embodiments referring to a spectral sensing device, wherein the spectral sensing device comprises a plurality of detector elements arranged in a detector array.

Embodiment 35: A computer program for calibrating a spectral sensing device comprising instructions which, when the computer program is executed by a computer or computer network, cause the computer or computer network to perform at least step IV. of the method of calibrating a spectral sensing device according to any one of the preceding embodiments referring to a method of calibrating a spectral sensing device.

Embodiment 36: The computer program according to the preceding embodiment, further comprising instructions which, when the computer program is executed by the computer or computer network, cause the computer or computer network to control performing steps I. to III. of the method of calibrating a spectral sensing device according to any one of the preceding embodiments referring to a method of calibrating a spectral sensing device.

Embodiment 37: A computer-readable storage medium comprising instructions which, when executed by a computer or computer network, cause the computer or computer network to perform at least step IV. of the method of calibrating a spectral sensing device according to any one of the preceding embodiments referring to a method of calibrating a spectral sensing device.

Embodiment 38: The computer-readable storage medium according to the preceding embodiment, further comprising instructions which, when executed by the computer or computer network, cause the computer or computer network to control performing steps I. to III. of the method of calibrating a spectral sensing device according to any one of the preceding embodiments referring to a method of calibrating a spectral sensing device.

Embodiment 39: A computer program for determining at least one calibrated optical property of at least one sample comprising instructions which, when the computer program is executed by a computer or computer network, cause the computer or computer network to perform at least step v. of the method of determining at least one calibrated optical property of at least one sample according to any one of the preceding embodiments referring to a method of determining at least one calibrated optical property of at least one sample.

Embodiment 40: The computer program according to the preceding embodiment, further comprising instructions which, when the computer program is executed by the computer or computer network, cause the computer or computer network to control performing steps iii. and iv. of the method of determining at least one calibrated optical property of at least one sample according to any one of the preceding embodiments referring to a method of determining at least one calibrated optical property of at least one sample.

Embodiment 41: The computer program according to any one of the two preceding embodiments, further comprising instructions which, when the computer program is executed by the computer of computer network, cause the computer of computer network to prompt a user to perform steps i. and ii. of the method of determining at least one calibrated optical property of at least one sample according to any one of the preceding embodiments referring to a method of determining at least one calibrated optical property of at least one sample.

Embodiment 42: A computer-readable storage medium comprising instructions which, when executed by a computer or computer network, cause the computer or computer network to perform at least step v. of the method of determining at least one calibrated optical property of at least one sample according to any one of the preceding embodiments referring to a method of determining at least one calibrated optical property of at least one sample.

Embodiment 43: The computer-readable storage medium according to the preceding embodiment, further comprising instructions which, when executed by the computer or computer network, cause the computer or computer network to control performing steps iii. and iv. of the method of determining at least one calibrated optical property of at least one sample according to any one of the preceding embodiments referring to method of determining at least one calibrated optical property of at least one sample.

Embodiment 44: The computer-readable storage medium according to any one of the two preceding embodiments, further comprising instructions which, when executed by the computer of computer network, cause the computer of computer network to prompt a user to perform steps i. and ii. of the method of determining at least one calibrated optical property of at least one sample according to any one of the preceding embodiments referring to a method of determining at least one calibrated optical property of at least one sample.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
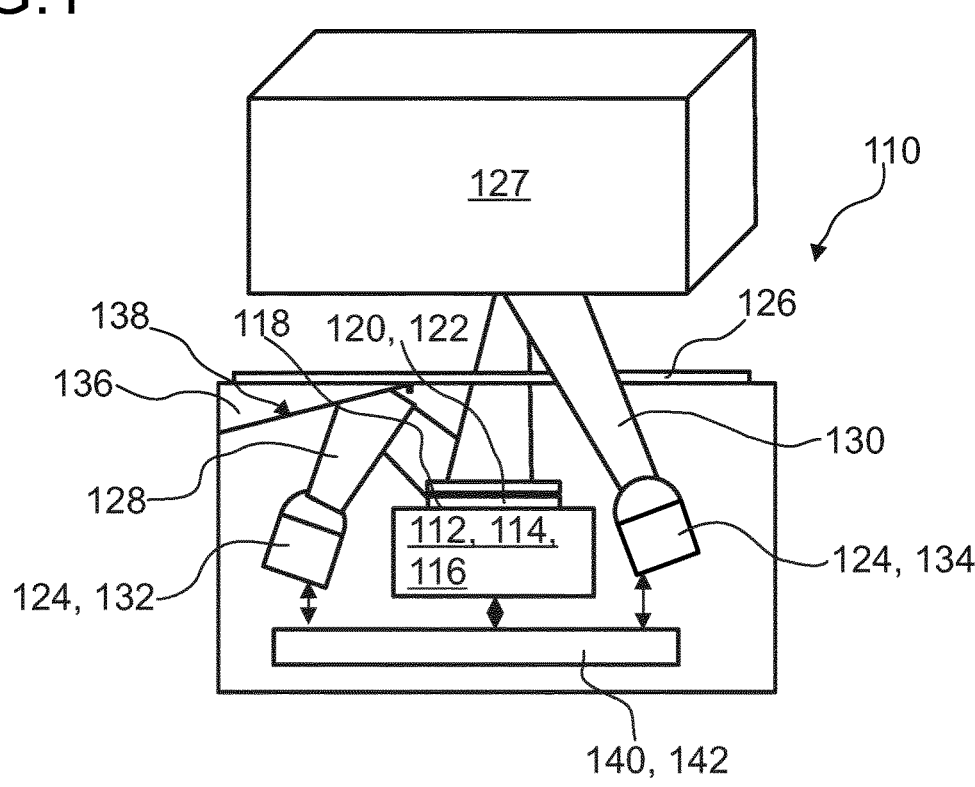
FIGS. 1 to 3 show different embodiments of a spectral sensing device.

FIG. 1 shows a first exemplary embodiment of a spectral sensing device 110 in a schematic view. The spectral sensing device 110 comprises at least one detector element 112 configured for generating at least one detector signal in response to an illumination of the detector element 112 by incident light. Specifically, the spectral sensing device 110 may comprise a plurality of detector elements 112 arranged in a detector array 114. Each of the plurality of detector elements 112 may comprise at least one photosensitive element 116 having at least one photosensitive area 118 configured for recording a photoresponse in response to an illumination of the respective detector element 112.

The spectral sensing device 110 further comprises at least one wavelength-selective element 120 configured for transferring incident light within at least one selected wavelength range onto the detector element 112. For example, the wavelength-selective element 120 may comprise a filter element 122, such as a linear variable filter or an optical filter, specifically a narrow band pass filter. However, other wavelength-selective elements 120, such as a prism or a grating, are also feasible.

The spectral sensing device 110 comprises at least one light source 124 configured for emitting light in at least one optical spectral range. As exemplarily shown in FIG. 1, the spectral sensing device 110 may comprise two light sources 124. The spectral sensing device 110 further comprises at least one sample interface 126 configured for allowing light from the light source 124 to illuminate at least one sample 127 and configured for allowing light from the sample 127 to propagate via the wavelength-selective element 120 to the detector element 112.

The spectral sensing device 110 comprises at least one first optical path 128 and at least one second optical path 130. The first optical path 128 is configured for allowing light emitted from the light source 124 to propagate via the wavelength-selective element 120 to the detector element without passing the sample interface 126. The second optical path 130 is configured for allowing light emitted from the light source 124 to propagate via the wavelength-selective element 120 to the detector element 112 by passing the sample interface 126 at least once.

As outlined above, the spectral sensing device 110 may comprise two light sources 124. In this example, a first light source 132 may be arranged to illuminate the first optical path 128 and a second light source 134 may be arranged to illuminate the second optical path 130. The spectral sensing device 110 may further comprise at least one reflection element 136 in the first optical path 128. The first light source 132 may be arranged to illuminate the reflection element 136. The reflection element 136 may reflect incident light onto the wavelength-selective element 120. The reflection element may comprise at least one reflecting surface 138. The reflecting surface 138 may be one or more of a metallic reflecting surface and a reflecting polymer surface. The reflection at the reflection element 136 may be a specular reflection of light. The reflection at the reflection element 136 may be a broadband reflection, specifically a uniform reflection for multiple wavelengths within at least one range of wavelengths. As can further be seen in FIG. 1, the second light source 134 may be arranged to illuminate the sample interface 126.

The spectral sensing device 110 further comprises at least one evaluation unit 140. The evaluation unit 140 is configured for determining at least one calibrated optical property of the sample 127 by using the method of determining at least one calibrated optical property of at least one sample 127 according to the present invention, such as according to the exemplary embodiment shown in FIG. 5 and described in further detail below. As shown in FIG. 1, the evaluation unit 140 may be configured for receiving and/or for retrieving detector signals from the detector element 112. The evaluation unit 140 may specifically be configured for evaluating, such as by determining at least one item of calibration information and determining the calibrated optical property, the received and/or retrieved detector signals. Specifically, the evaluation unit 140 may comprise one or more processors 142, wherein the one or more processors may be configured, such as by software programming, for performing one or more evaluation operations.

Figure 2:
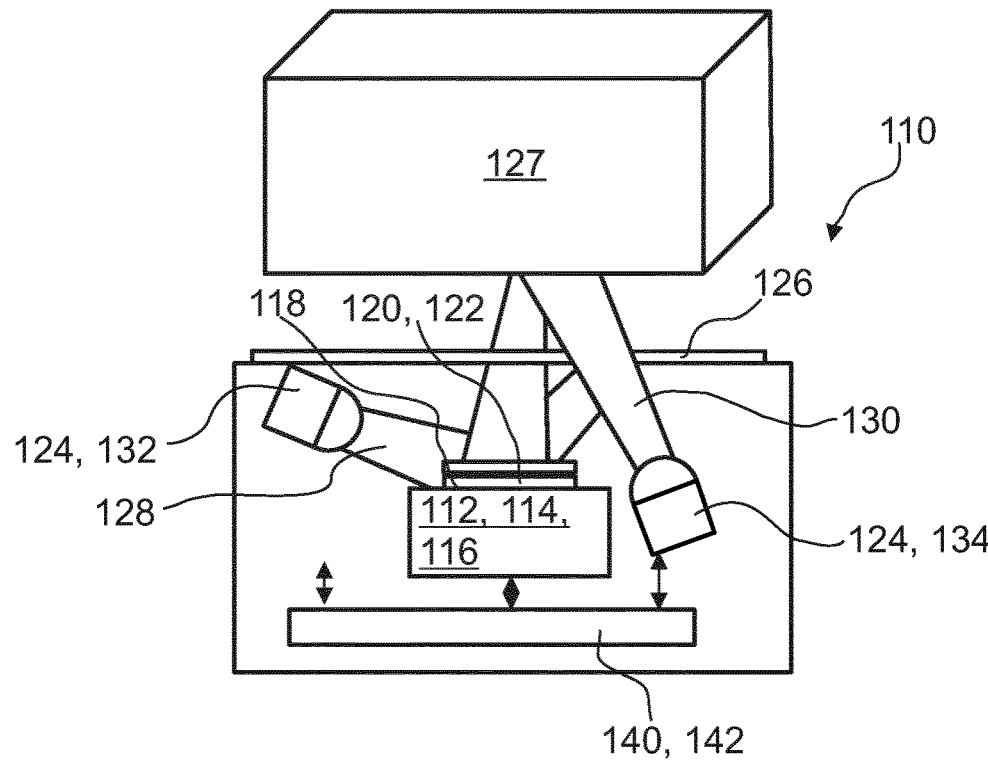

In FIG. 2, a second exemplary embodiment of the spectral sensing device 110 is shown in a schematic view. The embodiment of the spectral sensing device 110 shown in FIG. 2 widely corresponds to the embodiment shown in FIG. 1. Thus, reference is made to the description of FIG. 1. However, as can be seen in FIG. 2, the spectral sensing device 110 may have no reflection element 136. The first light source 132 may be arranged to directly illuminate the wavelength-selective element 120. Thus, in this example, the first light source 132 may directly illuminate the detector element 112 without any other optical components in the first optical path 128.

Figure 3:
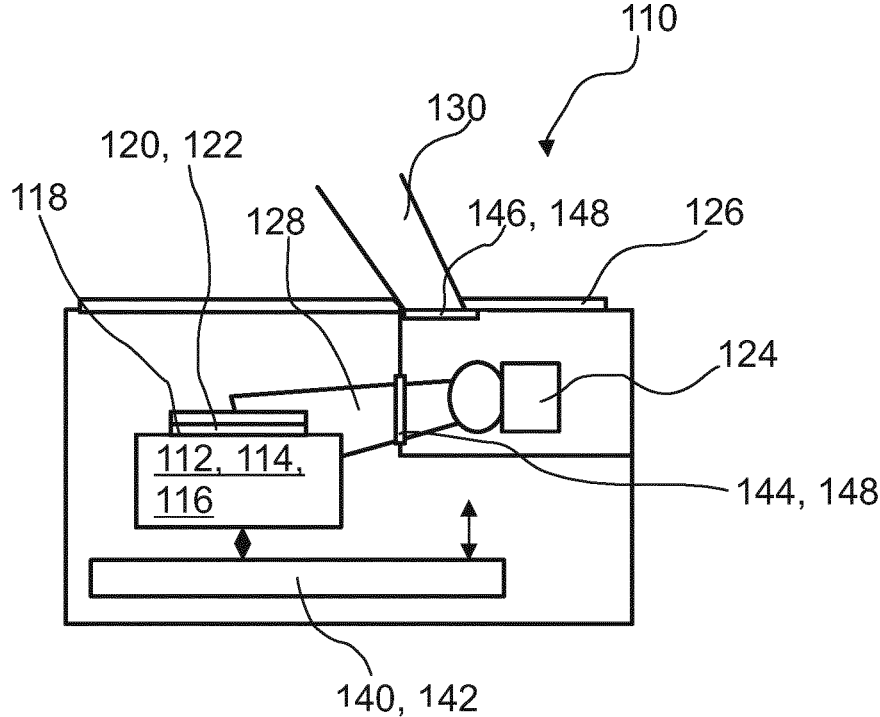

FIG. 3 shows a third exemplary embodiment of the spectral sensing device 110 in a schematic view. The embodiment of the spectral sensing device 110 shown in FIG. 3 widely corresponds to the embodiment shown in FIG. 1. Thus, reference is made to the description of FIG. 1. In this exemplary embodiment, the spectral sensing device 110 comprises only one light source 124. The light source 124 may specifically be arranged to illuminate the first optical path 128 and the second optical path 130.

As shown in FIG. 3, the spectral sensing device 110 may further comprise at least one first optical modulator 144 arranged in the first optical path 128 configured for modulating light in the first optical path 128 and at least one second optical modulator 146 arranged in the second optical path 130 configured for modulating light in the second optical path 130. The first optical modulator 144 may be configured for modulating light in the first optical path 128 with a first modulation frequency and the second optical modulator 146 may be configured for modulating light with a second modulation frequency. The evaluation unit 140 may be configured for distinguishing detector signals obtained by illumination via the first optical path 128 and the second optical path 130 by distinguishing detector signal associated with the first and the second modulation frequency, respectively. As an example, the first optical modulator 144 and the second optical modulator 146 may comprise a mechanical optical modular 148, such as a chopper and/or a slit. However, other optical modulators, such as acousto-optic modulators, electro-optic modulators, spatial light modulators or liquid crystal light modulators may also be feasible.

Figure 4A:
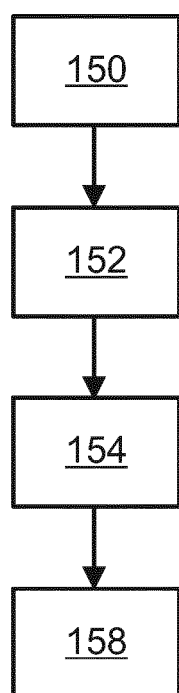
FIGS. 4A to 4C shows a flow chart of an embodiment of a method of calibrating a spectral sensing device (FIG. 4A) and corresponding embodiments of a spectral sensing device (FIGS. 4B and 4C)
Figure 4B:
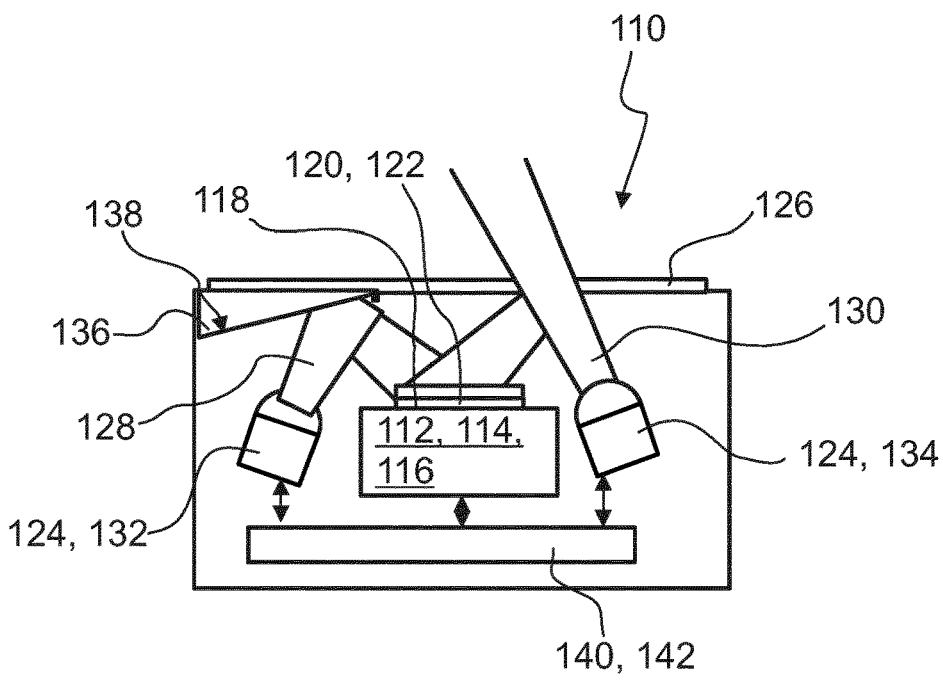
Figure 4C:
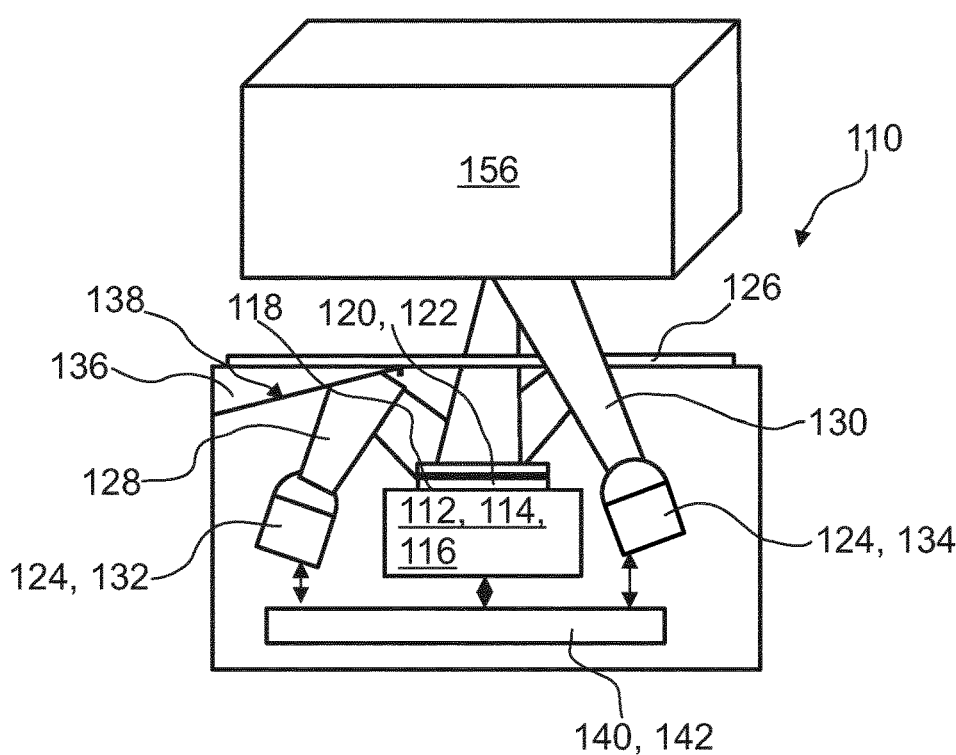

FIG. 4A shows a flow chart of an exemplary embodiment of a method of calibrating a spectral sensing device 110. In FIGS. 4B and 4C, exemplary situation of the spectral sensing device 110 during performance of the method are depicted. FIGS. 4B and 4C depicts the exemplary embodiment of the spectral sensing device 110 shown in FIG. 1. Thus, for a description of the spectral sensing device 110, reference is made to the description of FIG. 1. However, it shall be noted that for the method of calibrating a spectral sensing device 110 any other embodiment of the spectral sensing device 110 can be used, for example any one of the embodiments shown in FIGS. 2 and 3.

The method comprises the following steps which, as an example, may be performed in the given order. It shall be noted, however, that a different order is also possible. Further, it is also possible to perform one, more than one or even all of the method steps once or repeatedly. Further, it is possible to perform two or more of the method steps simultaneously or in a timely overlapping fashion. The method may comprise further method steps which are not listed.

As can be seen in FIG. 4A, the method comprises:

I. (denoted by reference number 150) illuminating the detector element 112 via the at least one first optical path 128 to obtain at least one first detector signal;

II. (denoted by reference number 152) illuminating the detector element 112 via the at least one second optical path 130 with no sample applied to the sample interface 126 to obtain at least one open port detector signal;

III. (denoted by reference number 154) illuminating the detector element 112 via the at least one second optical path 130 with at least one calibration sample 156 applied to the sample interface 126 to obtain at least one calibration detector signal; and IV. (denoted by reference number 158) determining at least one item of calibration information by using the first detector signal, the open port detector signal and the calibration detector signal.

FIG. 4B shows the situation in which no sample is applied to the sample interface 126 of the spectral sensing device 110. Thus, in this configuration, step II. of the method of calibrating a spectral sensing device 110 may be performed. As can be seen in FIG. 4B, a portion of light in second optical path 130 may be reflected at the sample interface 126 and may provide illumination of the detector element 112 to obtain the open port detector signal.

FIG. 4C shows a situation in which the calibration sample 156 is applied to the sample interface 126. The calibration sample 156 may have known and/or predetermined optical properties, such as a known and/or predetermined reflectivity. Light reflected at the calibration sample 156 may propagate via the wavelength-selective element 120 to detector element 112 and may provide illumination of the detector element 112 to obtain the calibration detector signal.

The item of calibration information may comprise information on a first relation between the first detector signal and the calibration detector signal. The first relation may be given by equation 1, as outlined above. The item of calibration information may specifically comprise the factor b in the first relation of equation 1. Further, the method may comprise in step v. determining the first relation, specifically determining factor b.

Additionally, the item of calibration information may comprise information on a second relation between the first detector signal and the open port detector signal. The second relation may be given by equation 2, as outlined above. The item of calibration information may specifically comprise the factor a in the second relation of equation 2. Further, the method may comprise in step v. determining the second relation, specifically determining factor a. The item of calibration information, specifically the first relation and the second relation, more specifically factors a and b, may be stored and may subsequently be used for calibration purposes, such as for calibrating measurements performed with the spectral sensing device 110.

Figure 5:
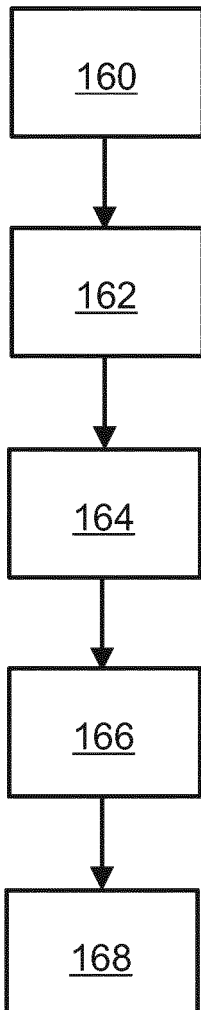
FIG. 5 shows a flow chart of an embodiment of a method of determining at least one calibrated optical property of at least one sample.

FIG. 5 shows a flow chart of an exemplary embodiment of a method of determining at least one calibrated optical property of at least one sample 127. The method comprises the following steps which, as an example, may be performed in the given order. It shall be noted, however, that a different order is also possible. Further, it is also possible to perform one, more than one or even all of the method steps once or repeatedly. Further, it is possible to perform two or more of the method steps simultaneously or in a timely overlapping fashion. The method may comprise further method steps which are not listed.

The Method Comprises:

i. (denoted by reference number 160) providing the spectral sensing device 110 as defined for the method of calibrating a spectral sensing device 110 according to the present invention, such as according to any one of exemplary embodiments shown in FIGS. 1 to 3 and/or according to any other embodiment described herein;

ii. (denoted by reference number 162) providing the at least one sample 127, specifically providing the at least one sample 127 to the sample interface 126;

iii. (denoted by reference number 164) illuminating the detector element 112 via the at least one first optical path 128 to obtain at least one first detector signal;

iv. (denoted by reference number 166) illuminating the detector element 112 via the at least one second optical path 130 to obtain at least one second detector signal; and v. (denoted by reference number 168) determining the at least one calibrated optical property of the sample 127 by using the first detector signal, the second detector signal and the at least one item of calibration information determined by using the method of calibrating a spectral sensing device 110 according to the present invention, such as according to the exemplary embodiment shown in FIG. 4A and/or according to any other embodiment described herein.

The calibrated optical property of the sample 127 may specifically be an optical reflectivity of the sample $R_{Sample}$. In general, the optical reflectivity of the sample $R_{Sample}$ may be determined according equation 3, as outlined above. As further outlined above, the item of calibration information may comprise information on the first relation between the first detector signal and at least one calibration detector signal. The first relation may be given by equation 4. Additionally, the item of calibration information may comprise information on the second relation between the first detector signal and at least one open port detector signal. The second relation may be given by equation 5. Thus, considering equations 3 to 5, the calibrated optical property may be $$R_{Sample} = \frac{S_{Sample,path2} - a * S_{path1}}{c * S_{path1}}, \qquad \text{(Eq. 18)}$$

wherein c=b−a, wherein $S_{path1}$ denotes the first detector signal and $S_{Sample,path2}$ denotes the second detector signal.

LIST OF REFERENCE NUMBERS 110 spectral sensing device
112 detector element
114 detector array
116 photosensitive element
118 photosensitive area
120 wavelength-selective element
122 filter element
124 light source
126 sample interface
127 sample
128 first optical path
130 second optical path
132 first light source
134 second light source 136 reflection element
138 reflecting surface
140 evaluation unit
142 processor
144 first optical modulator
146 second optical modulator
148 mechanical optical modular
150 illuminating the detector element via the first optical path
152 illuminating the detector element via the second optical path with no sample
154 illuminating the detector element via the second optical path with at least one calibration sample
156 calibration sample
158 determining at least one item of calibration information
160 providing the spectral sensing device
162 providing the sample
164 illuminating the detector element via the first optical path
166 illuminating the detector element via the second optical path
168 determining the at least one calibrated optical property of the sample

The invention claimed is:

1. A method of calibrating a spectral sensing device, the spectral sensing device comprising:

a. at least one detector element configured for generating at least one detector signal in response to an illumination of the detector element by incident light;

b. at least one wavelength-selective element configured for transferring incident light within at least one selected wavelength range onto the detector element;

c. at least one light source configured for emitting light in at least one optical spectral range;

d. at least one sample interface configured for allowing light from the light source to illuminate at least one sample and configured for allowing light from the sample to propagate via the wavelength-selective element to the detector element;

e. at least one first optical path, wherein the first optical path is configured for allowing light emitted from the light source to propagate via the wavelength-selective element to the detector element without passing the sample interface; and f. at least one second optical path, wherein the second optical path is configured for allowing light emitted from the light source to propagate via the wavelength-selective element to the detector element by passing the sample interface at least once;

the method comprising:

I. illuminating the detector element via the at least one first optical path to obtain at least one first detector signal;

II. illuminating the detector element via the at least one second optical path with no sample applied to the sample interface to obtain at least one open port detector signal;

III. illuminating the detector element via the at least one second optical path with at least one calibration sample applied to the sample interface to obtain at least one calibration detector signal; and IV. determining at least one item of calibration information by using the first detector signal, the open port detector signal and the calibration detector signal.

2. The method according to claim 1, wherein the item of calibration information comprises information on a first relation between the first detector signal and the calibration detector signal, wherein the first relation is given by $$S_{100\%Target,path2} = b * S_{path1},$$

wherein $S_{100\%\ Target,path2}$ denotes the calibration detector signal and $S_{path1}$ denotes the first detector signal, wherein b is a numerical factor, wherein the method comprises in step v. determining the first relation.

3. The method according to claim 1, wherein the item of calibration information comprises information on a second relation between the first detector signal and the open port detector signal, wherein the second relation is given by $$S_{OpenPort,path2} = a * S_{path1},$$

wherein $S_{OpenPort,path2}$ denotes the open port detector signal and $S_{path1}$ denotes the first detector signal, wherein a is a numerical factor, wherein the method comprises in step v. determining the second relation.

4. A method of determining at least one calibrated optical property of at least one sample, the method comprising:
  i. providing a spectral sensing device;
  ii. providing the at least one sample;
  iii. illuminating the detector element via the at least one first optical path to obtain at least one first detector signal;
  iv. illuminating the detector element via the at least one second optical path to obtain at least one second detector signal; and
  v. determining the at least one calibrated optical property of the sample by using the first detector signal, the second detector signal and the at least one item of calibration information determined by using the method of calibrating a spectral sensing device according to claim 1.

5. The method according to claim 4, wherein the calibrated optical property of the sample is one or more of an optical absorbance and an optical reflectivity of the sample.

6. The method according to claim 4, wherein steps iii. and iv. are performed using at least one multiplexing method selected from the group consisting of: a time multiplexing method; and a frequency multiplexing method.

7. The method according to claim 4, wherein the item of calibration information is determined prior to step i. by performing a method of calibrating a spectral sensing device.

8. The method according to claim 4, wherein the item of calibration information comprises information on a first relation between the first detector signal and at least one calibration detector signal, wherein the first relation is given by $$S_{100\%Target,path2} = b * S_{path1},$$

wherein $S_{100\%\ Target,path2}$ denotes the calibration detector signal and $S_{path1}$ denotes the first detector signal.

9. The method according to claim 8, wherein the item of calibration information comprises information on a second relation between the first detector signal and at least one open port detector signal, wherein the second relation is given by $$S_{OpenPort,path2} = a * S_{path1},$$

wherein $S_{OpenPort,path2}$ denotes the open port detector signal and $S_{path1}$ denotes the first detector signal, wherein the calibrated optical property of the sample (127) is an optical reflectivity of the sample (127) $R_{sample}$, wherein $$R_{Sample} = \frac{S_{Sample,path2} - a * S_{path1}}{c * S_{path1}},$$

wherein c=b–a, wherein $S_{path1}$ denotes the first detector signal and $S_{Sample,path2}$ denotes the second detector signal, and wherein a, b, and c are numerical factors.

10. The method according to claim 4, wherein the method further comprises a re-calibration step, wherein the re-calibration step comprises re-determining the item of calibration information, wherein the re-calibration step comprises re-determining at least one of a first relation and a second relation.

11. A spectral sensing device comprising:
  a. at least one detector element configured for generating at least one detector signal in response to an illumination of the detector element by incident light;
  b. at least one wavelength-selective element configured for transferring incident light within at least one selected wavelength range onto the detector element;
  c. at least one light source configured for emitting light in at least one optical spectral range;
  d. at least one sample interface configured for allowing light from the light source to illuminate at least one sample and configured for allowing light from the sample to propagate via the wavelength-selective element to the detector element;
  e. at least one first optical path, wherein the first optical path is configured for allowing light emitted from the light source to propagate via the wavelength-selective element to the detector element without passing the sample interface;
  f. at least one second optical path, wherein the second optical path is configured for allowing light emitted from the light source to propagate via the wavelength-selective element to the detector element by passing the sample interface at least once; and
  g. at least one evaluation unit configured for determining at least one calibrated optical property of the sample by using the method of determining at least one calibrated optical property of at least one sample according to claim 4.

12. The spectral sensing device according to claim 11, wherein the light source is arranged to illuminate the first optical path and the second optical path, wherein the spectral sensing device further comprises at least one first optical modulator arranged in the first optical path configured for modulating light in the first optical path and at least one second optical modulator arranged in the second optical path configured for modulating light in the second optical path.

13. The spectral sensing device according to claim 11, wherein the spectral sensing device comprises two light sources, wherein a first light source is arranged to illuminate the first optical path, wherein a second light source is arranged to illuminate the second optical path, wherein the spectral sensing device further comprises at least one reflection element in the first optical path, wherein the first light source is arranged to illuminate the reflection element, wherein the reflection element reflects incident light onto the wavelength-selective element, or wherein the first light source is arranged to directly illuminate the wavelength-selective element.

14. A non-transitory computer readable medium for calibrating a spectral sensing device comprising instructions which, when the computer program is executed by a computer or computer network, cause the computer or computer network to perform at least step IV. of the method of calibrating a spectral sensing device according to claim 1.

15. A non-transitory computer readable medium for determining at least one calibrated optical property of at least one sample comprising instructions which, when the computer program is executed by a computer or computer network, cause the computer or computer network to perform at least step v. of the method of determining at least one calibrated optical property of at least one sample according to claim 4.

* * * * *